(12) United States Patent
Kempf et al.

(10) Patent No.: US 7,198,059 B2
(45) Date of Patent: Apr. 3, 2007

(54) APPARATUS AND SYSTEM FOR RETROFITTING WATER CONTROL VALVES

(75) Inventors: Dale Kempf, Clovis, CA (US); Ken Lum, Fresno, CA (US)

(73) Assignee: Grundfos Pumps Manufacturing Company, Olathe, KS (US)

( * ) Notice: Subject to any disclaimer, the term of this patent is extended or adjusted under 35 U.S.C. 154(b) by 357 days.

(21) Appl. No.: 10/832,492

(22) Filed: Apr. 27, 2004

(65) Prior Publication Data

US 2004/0194825 A1   Oct. 7, 2004

Related U.S. Application Data

(63) Continuation-in-part of application No. 10/394,795, filed on Mar. 21, 2003, now Pat. No. 7,073,528, which is a continuation-in-part of application No. 10/006,970, filed on Dec. 4, 2001, now Pat. No. 6,929,187, which is a continuation-in-part of application No. 09/697,520, filed on Oct. 25, 2000, now Pat. No. 6,536,464.

(60) Provisional application No. 60/465,854, filed on Apr. 28, 2003.

(51) Int. Cl.
   *F16K 49/00* (2006.01)
(52) U.S. Cl. ............... 137/337; 137/359; 137/360; 137/269; 236/12.11
(58) Field of Classification Search ............. 137/337, 137/359, 360, 269; 236/12.11
   See application file for complete search history.

(56) References Cited

U.S. PATENT DOCUMENTS

| | | | |
|---|---|---|---|
| 2,716,424 A | 8/1955 | Watts | |
| 2,833,695 A | 5/1958 | Kool | |
| 2,842,155 A | 7/1958 | Peters | |
| 3,232,336 A * | 2/1966 | Leslie et al. | 236/12.11 |
| 3,543,836 A | 12/1970 | Paulson et al. | |
| 3,741,195 A | 6/1973 | Ellis | |
| 3,989,058 A * | 11/1976 | Jackson et al. | 137/269 |
| 4,142,515 A | 3/1979 | Skaats | |
| 4,321,943 A | 3/1982 | Haws | |
| 4,331,292 A | 5/1982 | Zimmer | |
| 4,606,325 A | 8/1986 | Lujan, Jr. | |
| 4,930,551 A * | 6/1990 | Haws | 137/337 |

(Continued)

OTHER PUBLICATIONS

The Blumenauer Corporation Aqualink®, Why Wait for HOT Water?; Apr. 19, 2001; 4 pages, 2004.

(Continued)

*Primary Examiner*—A. Michael Chambers
(74) *Attorney, Agent, or Firm*—Small Patent Law Group; Dean D. Small

(57) ABSTRACT

A water control fixture having an operating valve and a thermostatically controlled bypass valve disposed in the fixture for bypassing water away from the fixture until the water temperature reaches a desired level. When pressurized water from the hot water heater reaches the desired temperature level at the fixture, the bypass valve closes and hot water is made available to the fixture. The bypass valve has a thermal actuator element that is thermally responsive to the temperature of the water. The fixture can have a housing with an interior chamber for operatively receiving the bypass valve. Various passages or channels can be provided to facilitate communication between the bypass valve and the water supply lines. Alternatively, the bypass valve can be positioned in the operating valve, including the moveable ball and the replaceable cylindrical valving cartridge types. A system using the in-fixture bypass valve is also provided.

87 Claims, 15 Drawing Sheets

U.S. PATENT DOCUMENTS

| | | | |
|---|---|---|---|
| 5,119,988 | A | 6/1992 | Fiedrich |
| 5,135,021 | A | 8/1992 | Pegg |
| 5,183,029 | A | 2/1993 | Ranger |
| 5,205,318 | A * | 4/1993 | Massaro et al. ............ 137/337 |
| 5,209,401 | A | 5/1993 | Fiedrich |
| 5,261,443 | A | 11/1993 | Walsh |
| 5,287,570 | A | 2/1994 | Peterson et al. |
| 5,323,803 | A | 6/1994 | Blumenauer |
| 5,503,183 | A * | 4/1996 | Fenn et al. ................ 137/597 |
| 5,572,985 | A | 11/1996 | Benham |
| 5,623,990 | A | 4/1997 | Pirkle |
| 5,819,785 | A | 10/1998 | Bardini |
| 5,829,467 | A | 11/1998 | Spicher |
| 5,873,518 | A | 2/1999 | Richmond et al. |
| 6,286,464 | B1 * | 9/2001 | Abraham et al. ......... 122/14.31 |

OTHER PUBLICATIONS

The Blumenauer Corporation Aqualink, How it Works; Apr. 19, 2001; 2 pages, 2004.

The Blumenauer Corporation, Aqua-Heat Hot water recirculating system; 4 pages, 2004.

Laing Autocirc® *Undersink Automatic Instant Hot Water Delivery System*; Model ACT-303-BTW; 2 pages, 2004.

Laing Autocirc®; Model No. Act-303-BTW; Economic Study; 3 pages, 2004.

Laing Instant Hot Water Delivery Systems; Autocirc™ Questions & Answers; 3 pages, 2004.

Metlund® (S-46, S01, and S02) PreFab Systems; S-Series HOt Water D'Mand® Systems For Standard Piping (non-recirc); Installation and Operating Instructions; 7 pages, 2004.

Metlund® D'Mand® Systems; Got Hot Water? 2 Pages, 2004.

Jim Dulley, Update Bulletin No. 991, 2001, 4 pages, 2004.

Metlund Systems, Advanced Conservation Technology, Inc., 16 pages, 2004.

Medlund Systems, Easy Installation Instructions, 10 pages, 2004.

Medlund Systems, Energy Technology Status Report—E.T.S.R., 11 pages, 2004.

Medlund Systems, Online Ordering, Purchasing Tips, 2 pages, 2004.

Grundfos Hot Water Recirculation Product and Application Guide, 10 pages, 2004.

NIBCO.com: Just Right, Hot Water In Seconds!, 10 pages, 2004.

The Chilipepper Hot Water Appliance, How to Get FASTER Hot Water!!!, 22 pages, 2004.

Installation and Operating Instructions for the Chilipepper Appliance, 2 pages, 2004.

IDS submitted Dec. 13, 2002 in U.S. Appl. No. 09/697,520, 5 pages.

Remarks Section of Amendment filed Jul. 18, 2002 in U.S. Appl. No. 09/697,520, 4 pages.

* cited by examiner

APPARATUS AND SYSTEM FOR RETROFITTING WATER CONTROL VALVES

CROSS-REFERENCE TO RELATED APPLICATIONS

This application claims the benefit of U.S. Provisional Application No. 60/465,854 filed Apr. 28, 2003, and is a continuation-in-part of U.S. patent application Ser. No. 10/394,795 filed Mar. 21, 2003, now U.S. Pat. No. 7,073,528 which is a continuation-in-part of 10/006,970 filed Dec. 4, 2001, now patented as U.S. Pat. No. 6,929,187, which is a continuation-in-part of U.S. patent application Ser. No. 09/697,520 filed Oct. 25, 2000, now patented as U.S. Pat. No. 6,536,464.

BACKGROUND OF THE INVENTION

In certain aspects, the present invention relates generally to apparatuses and systems for retrofitting water control valves used in home or industrial water distribution systems that supply water to various fixtures at different temperatures through different pipe systems. More specifically, the present invention relates to apparatuses and systems for retrofitting such water control valves to incorporate a bypass valve or other operating improvements, such as pressure balancing, without requiring removal or replacement of the valve housing that is mounted in the water distribution system. Even more specifically, the present invention relates to apparatuses and systems for retrofitting a tub/shower water control valve to incorporate a bypass valve so as to bypass cold or tepid water away from the associated fixture until it reaches the desired temperature.

In other aspects, the present invention relates generally to faucets and bypass valves for use in home or industrial water distribution systems that supply water to various fixtures at different temperatures through different pipes. More particularly, the present invention relates to faucets having bypass valves that are thermostatically controlled so as to automatically bypass water that is not at the desired temperature for use at the fixture. Even more particular, the present invention relates to faucets having an integral thermostatically controlled bypass valve.

Home and industrial water distribution systems distribute water to various fixtures, including sinks, bathtubs, showers, dishwashers and washing machines, that are located throughout the house or industrial building. The typical water distribution system brings water in from an external source, such as a city main water line or a private water well, to the internal water distribution piping system. The water from the external source is typically either at a cold or cool temperature. One segment of the piping system takes this incoming cold water and distributes it to the various cold water connections located at the fixtures where it will be used (i.e., the cold water side of a tub/shower valve). Another segment of the piping system delivers the incoming cold water to a water heater which heats the water to the desired temperature and distributes it to the various hot water connections where it will be used (i.e., the hot water side of the tub/shower valve). At the fixture, cold and hot water either flows through separate hot and cold water control valves that are independently operated to control the temperature of the water into the fixture by controlling the flow rate of water from the separate valves or, as is more typical for tub/shower installations, the water is mixed at a single valve that selectively controls the desired water temperature flowing from the fixture.

A well-known problem with most home and industrial water distribution systems is that hot water is not always readily available at the hot water side of the fixture when it is desired. This problem is particularly acute in water use fixtures that are located a distance from the hot water heater or in systems with poorly insulated pipes. When the hot water side of these fixtures is left closed for some time, such as overnight, the hot water in the hot water segment of the piping system sits in the pipes and cools. As a result, the temperature of the water between the hot water heater and the fixture lowers until it becomes cold or at least tepid. When opened again, it is not at all uncommon for the hot water side of such a fixture to supply cold water through the hot water valve when it is first opened and for some time thereafter. For instance, at the bathtub and/or shower fixture located some distance away from the water heater, the person desiring to use the tub/shower will either have to initially use cold or tepid water instead of hot water or wait for the distribution system to supply hot water through the open hot water valve. Most users have learned that to obtain the desired hot water, the hot water valve must be opened and left open for some time so that the cool water in the hot water side of the piping system will flow out ahead of the more recently heated hot water. For certain fixtures, such as virtually all dishwashers and washing machines, there typically is no easy method of "draining" away the cold or tepid water in the hot water pipes prior to utilizing the water in the fixture.

The inability to have hot water at the hot water side of the fixture when it is desired creates a number of problems. One problem, as described above, is having to utilize cold or tepid water when hot water is desired. Even in those fixtures where the person can allow the cold or tepid water to flow out of the fixture until the water reaches the desired warm or hot temperature, such as a bath or shower, there are certain problems associated with such a solution. One such problem is the waste of water that flows out of the fixture through the drain and, typically, to the sewage system. This good and clean water is wasted, resulting in unnecessary water treatment after flowing through the sewage system. This waste of water is compounded when the person is inattentive and hot water begins flowing down the drain and to the sewage system. Yet another problem associated with the inability to have hot water at the hot water valve when needed is the waste of time for the person who must wait for the water to reach the desired temperature before he or she-can take a bath or shower at the desired temperature.

The use of bypass valves and/or water recirculation systems in home or industrial water distribution systems to overcome the problems described above have been known for some time. The general objective of the bypass valve or recirculation system is to avoid supplying cold or tepid water at the hot water side of the piping system when the user desires hot water. U.S. Pat. No. 2,842,155 to Peters describes a thermostatically controlled water bypass valve, shown as FIG. 2 therein, that connects at or near the fixture located away from the water heater. The inventor discusses the problems of cool "hot" water and describes a number of prior art attempts to solve the problem. The bypass valve in the Peters patent comprises a cylindrical housing having threaded ends that connect to the hot and cold water piping at the fixture so as to interconnect these piping segments. Inside the housing at the hot water side is a temperature responsive element having a valve ball at one end that can sealably abut a valve seat. The temperature responsive element is a metallic bellows that extends when it is heated to close the valve ball against the valve seat and contracts when cooled to allow water to flow from the hot side to the cold side of the piping system when both the hot and cold water valves are closed. Inside the housing at the cold water side is a dual action check valve that prevents cold water from flowing to the hot water side of the piping system when the hot water valve or the cold water valve is open. An alternative embodiment of the Peters' invention shows the use of a spiral temperature responsive element having a finger portion that moves left or right to close or open the valve between the hot and cold water piping segments. Although the invention described in the Peters' patent relies on gravity or convection flow, similar systems utilizing pumps to cause a positive circulation are increasingly known. These pumps are typically placed in the hot water line in close proximity to the fixture where "instant" hot water is desired.

U.S. Pat. No. 5,623,990 to Pirkle describes a temperature-controlled water delivery system for use with showers and eye-wash apparatuses that utilize a pair of temperature responsive valves, shown as FIGS. 2 and 5 therein. These valves utilize thermally responsive wax actuators that push valve elements against springs to open or close the valves to allow fluid of certain temperatures to pass. U.S. Pat. No. 5,209,401 to Fiedrich describes a diverting valve for hydronic heating systems, best shown in FIGS. 3 through 5, that is used in conjunction with a thermostatic control head having a sensor bulb to detect the temperature of the supply water, U.S. Pat. No. 5,119,988 also to Fiedrich describes a three-way modulating diverting valve, shown as FIG. 6. A non-electric, thermostatic, automatic controller provides the force for the modulation of the valve stem against the spring. U.S. Pat. No. 5,287,570 to Peterson et al. discloses the use of a bypass valve located below a sink to divert cold water from the hot water faucet to the sewer or a water reservoir. As discussed with regard to FIG. 5, the bypass valve is used in conjunction with a separate temperature sensor.

Recirculating systems for domestic and industrial hot water heating utilizing a bypass valve are disclosed in U.S. Pat. No. 5,572,985 to Benham and U.S. Pat. No. 5,323,803 to Blumenauer. The Benham system utilizes a circulating pump in the return line to the water heater and a temperature responsive or thermostatically actuated bypass valve disposed between the circulating pump and the hot water heater to maintain a return flow at a temperature level below that at the outlet from the water heater. The bypass valve, shown in FIG. 2, utilizes a thermostatic actuator that extends or retracts its stem portion, having a valve member at its end, to seat or unseat the valve. When the fluid temperature reaches the desired level, the valve is unseated so that fluid that normally circulates through the return line of the system is bypassed through the circulating pump. The Blumenauer system utilizes an instantaneous hot water device comprising a gate valve and ball valve in a bypass line interconnecting the hot and cold water input lines with a pump and timer placed in the hot water line near the hot water heater.

Despite the devices and systems set forth above, many people still have problems with obtaining hot water at the hot water side of fixtures, particularly bath and/or shower fixtures, located away from the hot water heater or other source of hot water. Boosted, thermally actuated valve systems having valves that are directly operated by a thermal actuator (such as a wax filled cartridge) tend not to have any toggle action. Instead, after a few on-off cycles, the valves tend to just throttle the flow until the water reaches an equilibrium temperature, at which time the valve stays slightly cracked open. While this meets the primary function of keeping the water at a remote fixture hot, leaving the valve in a slightly open condition does present two problems. First, the lack of toggle action can result in scale being more likely to build up on the actuator because it is constantly extended. Second, the open valve constantly bleeds a small amount of hot or almost hot water into the cold water piping, thereby keeping the faucet end of the cold water pipe substantially warm. If truly cold water is desired (i.e., for brushing teeth, drinking, or making cold beverages), then some water must be wasted from the cold water faucet to drain out the warm water. If the bypass valve is equipped with a spring-loaded check valve to prevent siphoning of cold water into the hot water side when only the hot water faucet is open, then the very small flow allowed through the throttled-down valve may cause chattering of the spring loaded check valve. The chattering can be avoided by using a free floating or non-spring loaded check valve. It is also detrimental to have any noticeable crossover flow (siphoning) from hot to cold or cold to hot with any combination of faucet positions, water temperatures, or pump operation.

U.S. Pat. No. 6,536,464, the disclosure of which is incorporated herein as though fully set forth and having the same assignee as the present invention, describes an under-the-sink thermostatically controlled bypass valve and water circulating system with the bypass valve placed at or near a fixture (i.e., under the sink) to automatically bypass cold or tepid water away from the hot water side of the fixture until the temperature of the water reaches the desired level. Co-pending U.S. patent application Ser. No. 10/006,970, the disclosure of which is also incorporated herein as though fully set forth and having the same assignee as the present invention, describes a water control fixture having a thermostatically controlled bypass valve integral with the fixture, either in a separate chamber or in the operating valve, for bypassing cold or tepid water away from the hot side of the fixture. Co-pending U.S. patent application Ser. No. 10/394,795, the disclosure of which is also incorporated herein as though fully set forth and having the same assignee as the present invention, describes a bath and/or shower water control valve that is adapted to either attach to or which includes a bypass valve. Preferably, the above-mentioned bypass valves utilize a thermal actuator element that is thermally responsive to the temperature of the water to automatically control the diversion of water from the fixture, so as to maintain hot water availability at the hot water side of the fixture.

As set forth in patent application Ser. No. 10/394,795, water control fixtures typically used with bath and shower systems are incorporated into a support wall such that the water control handles and discharge faucets/heads protrude from openings in the wall. Typically, the wall opening is completely covered by a plate, referred to as an escutcheon plate, such that the water control valve is effectively located behind the wall. When it is necessary to repair or replace the water control valve, the plate is removed to allow access to the valve components located behind the wall. Due to the nature of their use, shower/tub fixtures are the most common problem areas with regard to the availability of hot water and, as such, can benefit greatly from the use of a bypass valve, such as a thermostatically controlled bypass valve. Unfortunately, retrofitting an attached or adjacent bypass valve to an existing shower control valve (i.e., one that is mounted into the water distribution system) has not been very practical. Generally, existing shower control valve designs do not lend themselves to hydraulic connections through which cooled-off water may be bypassed, as is relatively easily accomplished with angle stop hose connections under a sink. Although saddle valves could conceivably be utilized, the installation of these valves would require the gross enlargement of the opening in the shower wall. As a result, the retrofitting of an existing tub/shower installation to incorporate a bypass valve or other beneficial hydraulic improvements, such as pressure balanced valve spools and the like, has generally been impractical with existing valves and valve systems.

As is well known in the art, there are many different manufacturers of tub/shower water control valves and many different designs for such valves, particularly as many manufacturers have more than one design. Besides the currently available tub/shower water control valves, there are also a multitude of other such valves that are no longer commercially available (i.e., those replaced or upgraded with a different model). While a few manufacturers make "clones" of some of the popular designs, most of the tub/shower water-control valve designs are very different from each other. The existence of these many different designs complicates the ability to provide an apparatus and/or system for retrofitting the tub/shower water control valve to incorporate a bypass valve or other operating improvements, such as pressure balancing. None of the known prior art devices provide an apparatus or system that is adaptable for retrofitting the multitude of different tub/shower water-control valve designs to incorporate a bypass valve. What is needed, therefore, is an apparatus and system for retrofitting water control valves that is configured to be adaptable to various tub/shower water-control valves in order to add the ability to bypass cold or tepid water from the tub/shower fixture until the water flowing in the hot water side reaches the desired temperature and/or to add the ability to obtain pressure balancing or other operating improvements.

SUMMARY OF THE INVENTION

In accordance with certain embodiments, an apparatus and system are provided for retrofitting water control valves that solves the problems and provides the benefits identified above. That is to say, an apparatus and system are provided for retrofitting water control valves, particularly tub/shower valves, so as to incorporate a bypass valve, such as a thermostatically controlled bypass valve, to automatically bypass cold or tepid water away from the hot water side of the fixture while the temperature of the water is below the desired level so as to maintain hot water for use at the tub/shower fixture. The apparatus and system are useful for water control valves that are mounted in the water distribution system and located at least partially behind the support wall. The apparatus and system for retrofitting water control valves are adaptable to a wide variety of different water control valve and fixture designs. A single small circulating pump can be placed between the water heater and the first branching in the hot water supply line which supplies a water control valve having a bypass valve to pressurize the hot water piping system and facilitate bypassing of the cold or tepid water. The apparatus and system for retrofitting water control valves can also be utilized to incorporate other hydraulic improvements, such as pressure balancing valves and the like.

For purposes of this disclosure, the term "water control valve" is the mixing valve at the water control fixture as opposed to the selector valve that diverts mixed water from the bathtub to the shower or from the fixed shower head to a hand-held shower head. The term "water control fixture" specifically includes tub spouts and shower heads, which are often used in combination in a tub/shower system, and includes other types of fixtures, such as sinks and water use apparatuses, that may be useable with the present invention.

In one embodiment of the present invention, the apparatus and system for retrofitting water control valves is utilized to incorporate a bypass valve in the water control fixture system to automatically bypass cold or tepid water away from the hot water side of the tub/shower fixture while the temperature of the water is below the desired level so as to maintain hot water at the tub/shower water control valve when desired by the user. Although a variety of bypass valves may be used, the preferred embodiment utilizes a thermostatically controlled bypass valve having a thermally sensitive actuating element, such as a wax-filled cartridge actuator, to bypass the cold or tepid water past the tub/shower valve. The above embodiment also incorporates a self-cleaning screen disposed in the water control valve so as to keep debris out of the bypass valve. The actuating element has an actuating body and a rod member, the rod member being configured to operatively extend from the actuating body to seal against a passage located in the separating wall to prevent water flow through the passage. A bias spring is located in the bypass valve body to urge the rod member toward the actuating body so as to open the passage. A check valve can be used in the bypass valve to prevent flow of water from the cold water side to the hot water side.

An embodiment of the apparatus and system for retrofitting water control valves of the present invention is configured for use with an existing valve manifold "housing" that is mounted in a water distribution system having a source of cold water, a source of hot water and a water control fixture, such as a shower/tub system having a shower head and tub spout. The valve manifold, which will typically be an existing valve manifold, has a cartridge mounting surface, most often in the form of a cylindrical or spherical cavity, with a valve cartridge interface comprising a hot water inlet port, a cold water inlet port and a discharge port. The retrofit bypass valve system includes an adapter plug configured with a plug body having a first end that is received in or against the cartridge mounting surface of the valve manifold and a first plug interface at the first end that is configured to hydraulically interact with the valve cartridge interface. The second end of the plug body has a second plug interface adapted for hydraulic connection, typically by way of one or more fluid connectors, to a retrofit valve configured with a water control cartridge. The adapter plug has a plurality of passageways interconnecting the first plug interface and the second plug interface. In the preferred embodiment, the retrofit valve has a valve body with a first fluid chamber, a second fluid chamber and a bypass channel hydraulically interconnecting the first fluid chamber and the second fluid chamber. The water control cartridge, preferably one having a pressure balancing feature, is disposed in the first fluid chamber of the retrofit valve. The water control cartridge, which can be an "off-the-shelf" cartridge, is configured to selectively mix water from the source of cold water and the source of hot water and discharge water to the water control fixture. A bypass valve disposed in the second fluid chamber is configured to bypass water from the source of hot water until the temperature of the water at the bypass valve is at a desired, typically pre-set, temperature. In a preferred embodiment, the retrofit system also includes a new escutcheon plate that is configured to cover the adapter plug and retrofit valve and a flow control handle that is operatively attached to the water control cartridge. The escutcheon plate can have a blister portion that is adapted to provide additional space to cover the adapter plug and the retrofit valve.

A bracket that attaches to one or more mounting devices (such as tabs, lugs, threaded housing diameters, etc.) associated with the existing valve manifold can be utilized to support the new escutcheon plate and retrofit valve. In the preferred embodiment, the bypass valve is a thermostatically controlled bypass valve having a bypass valve inlet, a bypass valve outlet and a thermally sensitive actuating element disposed therebetween. The thermally sensitive actuating element can comprise an actuating body and a rod member, wherein the rod member is configured to operatively extend from the actuating body and seat against a valve seat so as to close the bypass valve. A bias spring can be disposed in the bypass valve between the valve seat and the actuating body to urge the rod member away from the valve seat toward the actuating body so as to open the bypass valve and bypass any cold or tepid water so as to provide instant hot water at the shower/tub fixture.

Accordingly, an objective of the present invention is to provide an apparatus and system for retrofitting water control valves that provides the advantages discussed above and that overcomes the disadvantages and limitations associated with presently available apparatuses and systems for retrofitting water control valves, particularly those mounted in a water distribution system.

It is also an objective of the present invention to provide an apparatus and system for retrofitting water control valves that is configured to incorporate a bypass valve which is configured for bypassing water from a hot water piping system to a cold water piping system at the water control valve until the temperature of the water in the hot water piping system is at the desired level.

It is also an objective of the present invention to provide an apparatus and system for retrofitting tub/shower water control valves to incorporate a thermostatically controlled bypass valve to automatically bypass cold or tepid water from the tub/shower fixture so as to maintain hot water at the fixture.

It is also an objective of the present invention to provide an apparatus and system for retrofitting water control valves that is adaptable to a wide variety of different installed water control valve designs.

It is also an objective of the present invention to provide an apparatus and system for retrofitting water control valves so the water control fixture may include a thermostatically controlled bypass valve that utilizes a thermally sensitive actuating element having a rod member configured to operatively open and close a passage between the hot and cold sides of the bypass valve based on the temperature of the water at the fixture.

It is also an objective of the present invention to provide an apparatus and system for retrofitting water control valves that is adaptable for installing various hydraulic improvements, such as instant hot water, pressure balancing, anti-scalding and/or temperature sensitive mixing, at the water control fixture without having to remove or replace the installed water control valve manifold.

It is also an objective of the present invention to provide a process for retrofitting water control valves to incorporate a bypass valve at a water control fixture for bypassing cold or tepid water from the fixture so as to maintain hot water at the hot water side of the water control valve.

In accordance with certain embodiments, a water control fixture having a thermostatically controlled bypass valve is provided that solves the problems and provides the benefits identified above. A water control fixture, such as a faucet, having an integral thermostatically controlled bypass valve is provided to automatically bypass cold or tepid water away from the hot water side of the fixture until the temperature of the water reaches the desired level. The thermostatically controlled bypass valve is adaptable to a wide variety of faucet designs. A single small circulating pump can be placed between the water heater and the first branching in the hot water supply line which supplies a fixture having a bypass valve to pressurize the hot water piping system and facilitate bypassing of the cold or tepid water.

In an embodiment of the present invention, the water control fixture is a faucet or solenoid operated valve, such as used on laundry washing machines, having a bypass valve and is generally comprised of a standard faucet with a thermally sensitive actuating element, such as a wax-filled cartridge actuator, disposed in the interior of the faucet body. The actuating element has an actuating body and a rod member, the rod member being configured to operatively extend from the actuating body to seal against, or operate as a spool valve, a passage located in the separating wall to prevent water flow through the passage. A bias spring is located in the faucet body to urge the rod member toward the actuating body so as to open the passage. A check valve is located in the faucet body to prevent flow of water from the cold water side to the hot water side.

Also, a water circulating system is provided for distributing water to a water control fixture, such as a faucet, that is configured for utilizing hot and cold water. The faucet has a hot water inlet and a cold water inlet. The hot water heater supplies hot water to the faucet through the hot water piping system that interconnects the hot water heater with the hot water inlet at the faucet. The system also has a source of cold water, such as the city water supply or a local well, for supplying cold water to the faucet through the cold water piping system that interconnects the source of cold water with the cold water inlet at the faucet. The source of cold water also supplies water to the hot water heater for distribution through the hot water piping system. As such, when the bypass valve located in the faucet is bypassing water the hot and cold water circulating systems form a loop. A faucet having a thermostatically controlled bypass valve interconnects the hot water piping system to the hot water inlet and the cold water piping system to the cold water inlet. The faucet's bypass valve is configured to bypass water from the hot water piping system to the cold water piping system until the water in the hot water piping system rises to a preset temperature value. The bypass valve can comprise the elements and be configured as described above. A single, small pump can be used in the hot water piping system to pump water through the hot water piping system to the hot water inlet on the fixture. In the preferred embodiment, the single pump is a low flow and low head pump. If necessary, a check valve can be used to pass water around the pump when the flow rate in the hot water piping system exceeds the flow rate capacity of the pump. An orifice can be located in the discharge of the pump to achieve the desired steep flow-head curve from available stock pumps A mechanism for cyclically operating the pump can be used to reduce electrical demand and wear and tear on the pump and bypass valve. In addition, a flow switch can be connected to the pump for detecting the flow rate of the water in the hot water piping system and for shutting off the pump when the flow in the hot water piping system exceeds the flow rate capacity of the bypass valve.

Accordingly, an objective of the present invention is to provide a faucet or other water control fixture having a thermostatically controlled bypass valve that is suitable for bypassing water from a hot water piping system to a cold water piping system at a fixture until the temperature of the water in the hot water piping system rises to a preset level for use at the fixture.

It is also an objective of the present invention to provide a faucet or other water control fixture having a thermostatically controlled bypass valve that utilizes a thermally sensitive actuating element having a rod member configured to operatively open and close a passage between the hot and cold sides of the bypass valve based on the temperature of the water adjacent to the fixture.

It is also an objective of the present invention to provide a faucet having a thermostatically controlled bypass valve that includes a check valve in the bypass valve to prevent the flow of water from the cold water piping system to the hot water piping system when the bypass valve is cold and thus in an open condition.

It is also an objective of the present invention to provide a water circulating system utilizing a faucet having a thermostatically controlled bypass valve located therein and a pump in the hot water piping system to circulate water from the hot water piping system to the cold water piping system through the faucet's bypass valve until the temperature of the water in the hot water piping system reaches a preset level.

It is also an objective of the present invention to provide a faucet or other water control fixture having a thermostatically controlled bypass valve that is adaptable to a wide variety of faucet or other fixture designs.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures and drawings are illustrative of the preferred embodiments and represent a preferred way of configuring the present invention. Although specific components, materials, configurations and uses are illustrated, it should be understood that a number of variations to the components and to the configuration of those components described herein and in the accompanying figures can be made without changing the scope and function of the invention set forth herein.

In the accompanying drawings of the various preferred embodiments of a water control valve, the tub/shower water control valve is shown as 10 (i.e., FIGS. 1 and 5) and a bypass valve is shown as 16 (i.e., FIG. 2) that is adaptable for use with the apparatus and system for retrofitting water control valve 10. However, other water control valves may be adaptable to the system for incorporating bypass valve 16, as described herein. Bypass valve 16 for use with water control valve 10 can be one of many different types of available bypass valves, including a thermostatically controlled bypass valve (as described in the patent and co-pending patent applications referenced above), an electric solenoid controlled bypass valve, a needle-type bypass valve as described in the above-referenced Blumenauer patent or a mechanical push button bypass valve such as sold by Laing and others. Pursuant to the apparatus and system of the present invention, as described in detail below, water control valve 10 is adaptable for use with various types of bypass valves 16.

Figure 1:
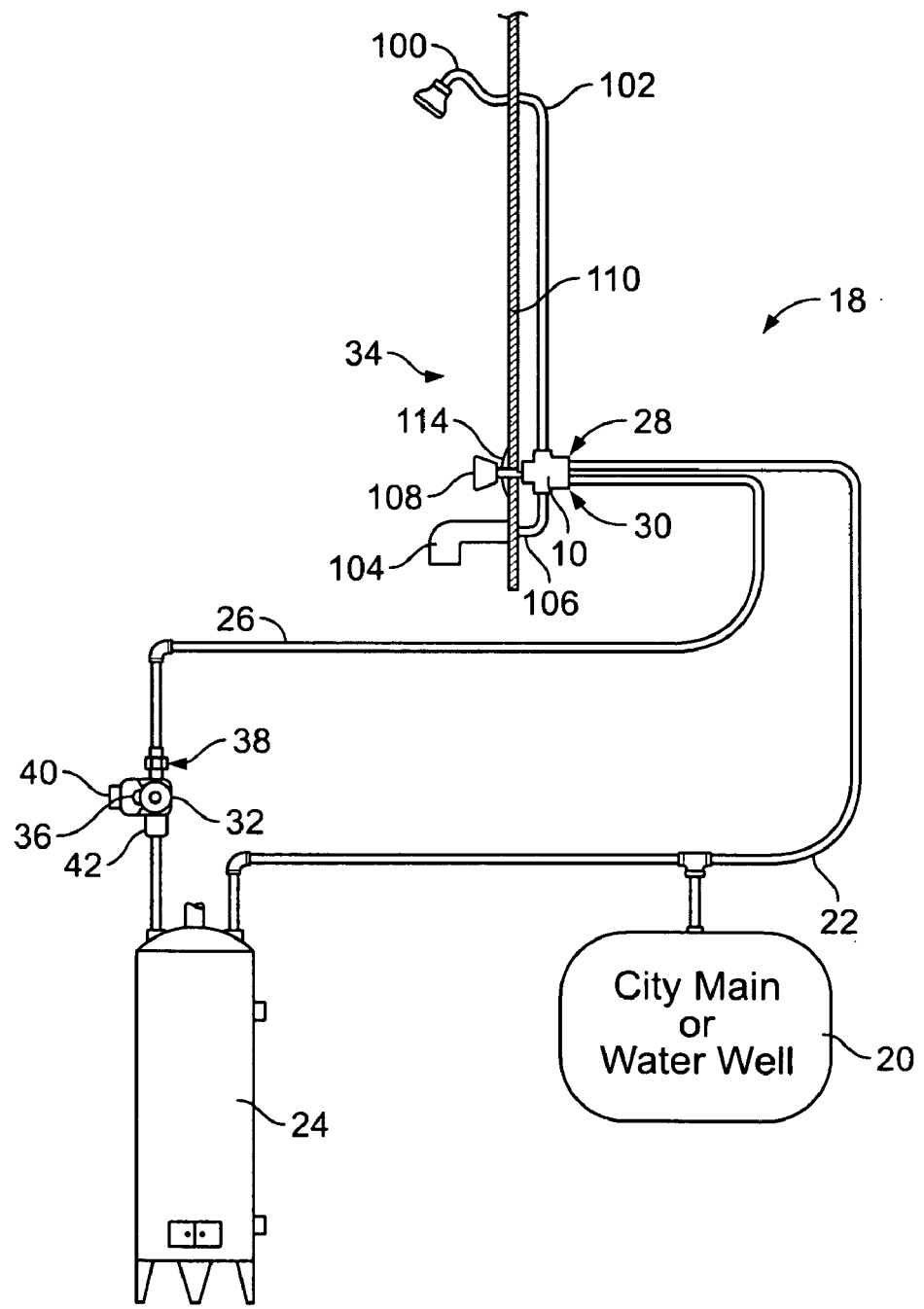
FIG. 1 shows a prior art water distribution system having a pump added to the hot water line to distribute hot and cold water to a water control valve in a shower/tub assembly.

A typical water distribution system 18 utilizing tub/shower water control valve 10 is illustrated in FIG. 1. A standard water distribution system 18 typically comprises a supply of cold water 20, such as from a city main or water well, that supplies cold water directly to water control valve 10 through cold water line 22 and water to hot water heater 24 so that it may heat the water and supply hot water to water control valve 10 through hot water line 26. Cold water line 22 connects to water control valve 10 at cold water inlet 28 and hot water line 26 connects to water control valve 10 at hot water inlet 30, as explained in more detail below. The preferred water distribution system 18 utilizes a small circulating pump 32 of the type used in residential hot water space heating. A very low flow and low head pump 32 is desirable because a larger (i.e., higher head/higher flow) pump mounted at the typical domestic water heater 24 tends to be noisy. This annoying noise is often transmitted by the water pipes throughout the house, In addition, if the tub/shower system 34 (as an example) is already in use when pump 32 turns on, whether the first start or a later cyclic turn-on, the sudden pressure boost in the hot water line 26 from a larger pump can result in an uncomfortable and possibly near-scalding temperature rise in the water at the shower head or other fixture in use. The smaller boost of a "small" pump (i.e., one with a very steep flow-head curve) will result in only a very small and less noticeable increase in shower temperature.

In an embodiment, the single, small pump 32 needs to provide only a flow of approximately 0.3 gpm at 1.0 psi pressure. In accordance with pump affinity laws, such a "small" pump requires a very small impeller or low shaft speed. The inventors have found that use of a very small impeller or low shaft speed also precludes formation of an air bubble in the eye of the impeller, which bubble may be a major cause of noise. Such a small steep curve pump may, however, constitute a significant pressure drop in the hot water line 26 when several fixture taps are opened simultaneously (such as a bathtub and the kitchen sink). To avoid reduced flow in those installations having a relatively low volume pump, a check valve 36 can be plumbed in parallel with pump 32 or incorporated within the pump housing, to pass a flow rate exceeding the pump's capacity around pump 32. When pump 32 is powered and flow demand is low, check valve 36 prevents the boosted flow from re-circulating back to its own inlet. With check valve 36 plumbed around pump 32, it is advantageous to place an orifice 38 in the pump discharge to provide a simple manner to achieve the desired very steep flow-head curve from available stock pump designs. A single pump 32 located at or near water heater 24 in its discharge piping will boost the pressure in the hot water pipes somewhat above that in the cold water pipes (i.e., perhaps one to three feet of boost). With this arrangement only one pump 32 per plumbing system (i.e., per water heater 24) is required with any reasonable number, such as the typical number used in residences, of remote water control valves (i.e., tub/shower valve 10), equipped with bypass valve 16 by retrofitting according to the apparatus and system of the present invention. This is in contrast to those systems that require multiple pumps 32, such as a pump 32 at each fixture where bypassing is desired.

If desired, pump 32 can operate twenty-four hours a day, with most of the time in the no flow mode. However, this is unnecessary and wasteful of electricity. Alternatively, and preferably, pump 32 can have a timer 40 to turn pump 32 on daily at one or more times during the day just before those times when hot water is usually needed the most (for instance for morning showers, evening cooking, etc.) and be set to operate continuously for the period during which hot water is usually desired. This still could be unnecessary and wasteful of electricity. Another alternative is to have the timer 40 cycle pump 32 on and off regularly during the period when hot water is in most demand. The "on" cycles should be of sufficient duration to bring hot water to all remote fixtures that have water control valves (such as tub/shower valve 10) equipped with bypass valve 16, and the "off" period would be set to approximate the usual time it takes the water in the lines to cool-down to minimum acceptable temperature. Yet another alternative is to equip pump 32 with a normally closed flow switch 42 sized to detect significant flows only (i.e., those flows that are much larger than the bypass flows), such as water flow during use of shower system 34. For safety purposes, the use of such flow switch 42 is basically required if a cyclic timer 40 is used. The switch 42 can be wired in series with the motor in pump 32. If switch 42 indicates an existing flow at the moment timer 40 calls for pump 32 to be activated, open flow switch 42 will prevent the motor from starting, thereby avoiding a sudden increase in water temperature at tub/shower fixture 34 being utilized. The use of switch 42 accomplishes several useful objectives, including reducing electrical power usage and extending pump 32 life if hot water is already flowing and there is no need for pump 32 to operate, avoiding a sudden temperature rise and the likelihood of scalding that could result from the pump boost if water is being drawn from a "mixing" valve (such as tub/shower valve 10 shown in FIG. 1 or a single handle faucet) and allowing use of a "large" pump 32 (now that the danger of scalding is eliminated) with its desirable low pressure drop at high flows, thereby eliminating the need for the parallel check valve 36 required with a "small" pump 32.

By using a time-of-day control timer 40, pump 32 operates to maintain "instant hot water" only during periods of the day when it is commonly desired. During the off-cycle times, the plumbing system 18 operates just as if the fixture having bypass valve 16 and pump 32 were not in place. This saves electrical power usage from operation of pump 32 and, more importantly, avoids the periodic introduction of hot water into relatively uninsulated pipes during the off-hours, thereby saving the cost of repeatedly reheating this water. The time-of-day control also avoids considerable wear and tear on pump 32 and bypass valve 16. Considerable additional benefits are gained by using a cyclic timer 40, with or without the time-of-day control. In addition to saving more electricity, if a leaky bypass valve 16 (i.e., leaks hot water to cold water line 22) or one not having toggle action is used, there will be no circulating leakage white the pump 32 is cycled off, even if bypass valve 16 fails to shut off completely. Therefore, a simple (i.e., not necessarily leak tight) bypass valve 16 may suffice in less demanding applications. Reducing leakage to intermittent leakage results in reduced warming of the water in cold water line 22 and less reheating of "leaking" re-circulated water.

Figure 2:
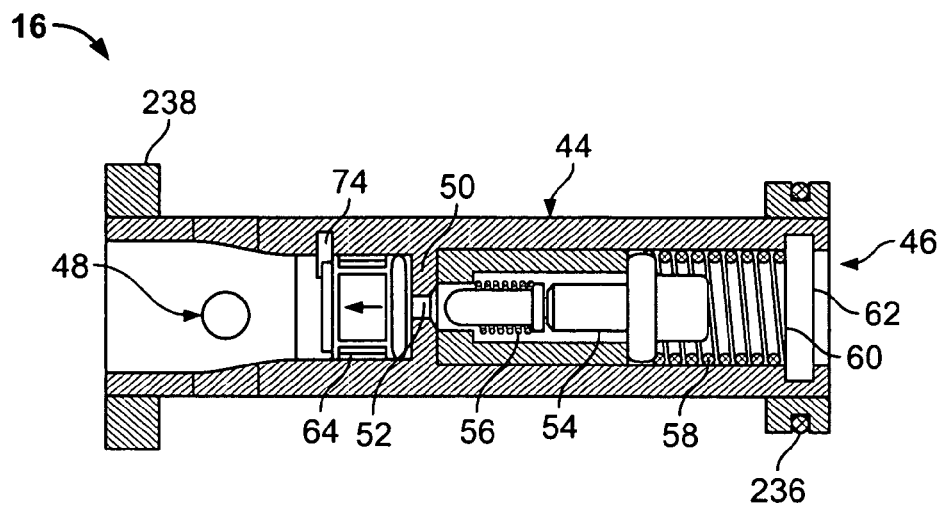
FIG. 2 is a cross-sectional side view of a bypass valve for use with the water control valves of the present invention.

As described above, the present invention can utilize various types of bypass valves 16 to accomplish the objective of bypassing cold or tepid water around the tub/shower fixture 34 associated with water control valve 10, which is adaptable for use with bypass valve 16. The preferred bypass valve 16 is the thermostatically controlled type, an example of which is shown in FIG. 2 and described in detail below, due to its ability to automatically sense and respond to the temperature of the water in hot water line 26 at water control valve 10. Unlike the electrical solenoid type of bypass valve or the manually operated type of bypass valve, a thermostatically controlled bypass valve 16 does not require any external operational input to activate in order to bypass cold or tepid water in hot water line 26 so as to maintain hot water at hot water inlet 30 of water control valve 10.

Figure 3:
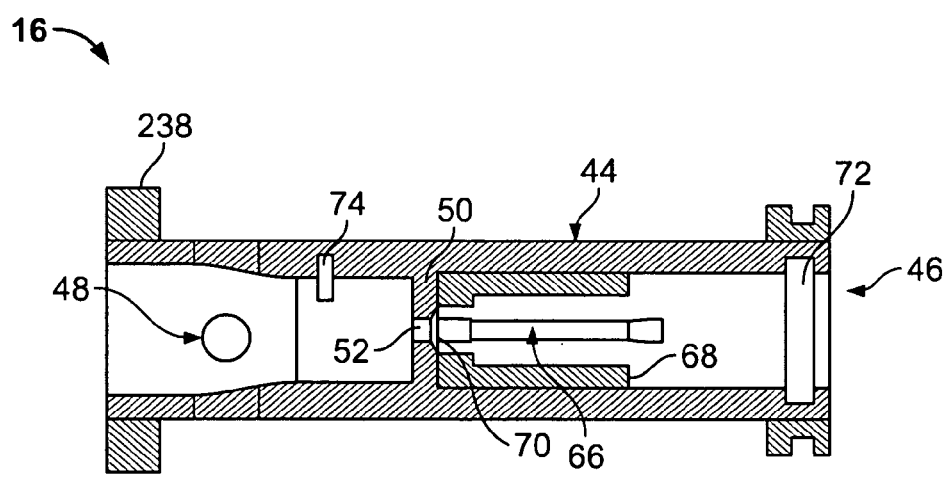
FIG. 3 is a cross-sectional side view of the valve body of the bypass valve shown in FIG. 2.
Figure 4:
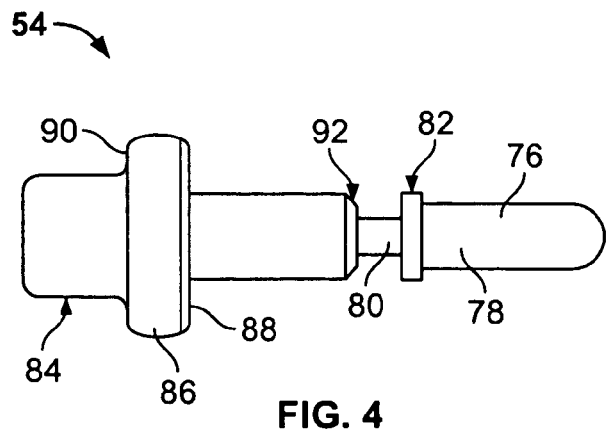
FIG. 4 is a side view of the preferred thermally sensitive actuating element, shown in its unmodified condition, for use in a preferred thermostatically controlled bypass valve of the present invention.

As best shown in FIGS. 2 through 4, the preferred thermostatically controlled bypass valve 16, which can be configured for use with water control valve 10, comprises a generally tubular bypass valve body 44 having bypass valve inlet 46, bypass valve outlet 48 and a separating wall 50 disposed therebetween. As described in more detail below, bypass inlet 46 hydraulically connects to hot water inlet 30 and bypass outlet 48 hydraulically connects to cold water inlet 28 of water control valve 10. Bypass valve passageway 52 in separating wall 50 interconnects inlet 46 and outlet 48 to allow fluid to flow therethrough when bypass valve 16 is bypassing cold or tepid water. As best shown in FIG. 2 and discussed in more detail below, valve body 44 houses a thermally sensitive actuating element 54, bias spring 56, an over-travel spring 58, self-cleaning screen 60, retaining mechanism 62 (such as a retaining ring, clip, pin or other like device) and check valve 64. The direction of flow for check valve 64 is shown with the arrow in FIG. 2. Valve body 44 can most economically and effectively be manufactured out of a molded plastic material, such as Ryton®, a polyphenylene sulphide resin available from Phillips Chemical, or a variety of other composites. In general, molded plastic materials are preferred due to their relatively high strength and chemical/corrosion resistant characteristics while providing the ability to manufacture the valve body 44 utilizing injection molding processes with the design based on the configuration described herein without the need for expensive casting or machining. Alternatively, valve body 44 can be manufactured from various plastics, reinforced plastics or metals that are resistant to hot chlorinated water under pressure. As shown in FIG. 3, inlet 46 of valve body 44 can be molded with a set of axially oriented fin guides 66 having ends that form an internal shoulder 68 inside valve body 44 for fixedly receiving and positioning one end of thermal actuating element 54 and bias spring 56, and retainer interruption 72 for receiving retaining mechanism 62. Preferably, retaining mechanism 62 is a retaining ring and retainer interruption 72 is configured such that when retaining mechanism 62 is inserted into valve body 44 it will be engagedly received by retainer interruption 72. Bypass valve outlet 48 can be molded with retaining slot 74 for engagement with the snap-in check valve 64. In the preferred embodiment, valve body 44 is designed so the internal components can fit through inlet 46 and outlet 48, which will typically be, nominally, one-half inch diameter. In this manner, a one piece bypass valve 16 results with no intermediate or additional joints required for installation. In the preferred embodiment, the end having bypass valve inlet 46 is kept close to screen 60 so that the full flow of hot water (when water is flowing from the tub spout or shower head) will wash across the surface of screen 60, making it self-cleaning.

An example of a thermally sensitive actuating element 54 for use with the thermostatically controlled bypass valve 16 is shown in FIG. 4. Actuating element 54 is preferably of the wax filled cartridge type, also referred to as wax motors, having an integral poppet rod member 76 comprising poppet 78 attached to piston 80 with an intermediate flange 82 thereon. The end of poppet 76 is configured to seat directly against valve seat 70 or move a shuttle (i.e., spool or sleeve valves) so as to close passage 52. These thermostatic control actuating elements 54 are well known in the art and are commercially available from several suppliers, such as Caltherm of Bloomfield Hills, Mich. The body 84 of actuating element 54 has a section 86 of increased diameter, having a first side 88 and second side 90, to seat against shoulder 68 or like element in valve body 44. Piston 80 of rod member 76 interconnects poppet 78 with actuator body 84. Actuating element 54 operates in a conventional and well known manner. Briefly, actuating element 54 comprises a blend of waxes or a mixture of wax(es) and metal powder (such as copper powder) enclosed in actuator body 84 by means of a membrane made of elastomer or the like. Upon heating the wax or wax with copper powder mixture expands, thereby pushing piston 80 and poppet 78 of rod member 76 in an outward direction. Upon cooling, the wax or wax/copper powder mixture contracts and rod member 76 is pushed inward by bias spring 56 until flange 82 contacts actuator body 54 at actuator seat 92. Although other types of thermal actuators, such as bimetallic springs and memory alloys (i.e., Nitinol and the like) can be utilized in the present invention, the wax filled cartridge type is preferred because the wax can be formulated to change from the solids to the liquid state at a particular desired temperature. The rate of expansion with respect to temperature at this change of state is many times higher, resulting in almost snap action of the wax actuating element 54. The temperature set point is equal to the preset value, such as 97 degrees Fahrenheit, desired for the hot water. This is a "sudden" large physical motion over a small temperature change. As stated above, this movement is reacted by bias spring 56 that returns rod member 76 as the temperature falls.

Because bypass valve 16 has little or no independent "toggle action," after a few consecutive cycles of opening and closing, bypass valve 16 tends to reach an equilibrium with the plumbing system, whereby bypass valve 16 stays slightly cracked open, passing just enough hot water to maintain the temperature constantly at its setting. In particular plumbing systems and at certain ambient conditions, this flow is just under that required to maintain a spring loaded check valve cracked continuously open (i.e., check valve 36). In such a situation, check valve 36 chatters with an annoying buzzing sound. To avoid this occurrence, the spring may be removed from check valve 36, leaving the check valve poppet free floating. In the event that the hot water is turned full on at a time when bypass valve 16 is open, thereby towering the pressure in hot water line 26 and inducing flow from cold water line 22 through the open bypass valve 16 to the hot side, the free floating poppet will quickly close. There is no necessity for a spring to keep check valve 36 closed prior to the reversal in pressures.

Although not entirely demonstrated in early tests, it is believed that beneficial "toggle" action can be achieved with an altered version of the thermostatically controlled bypass valve 16 discussed above. If the motion of actuating element 54 is made to lag behind the temperature change of the water surrounding it by placing suitable insulation around actuating element 54 or by partially isolating it from the "hot" water, then instead of slowly closing only to reach equilibrium at a low flow without reaching shutoff, the water temperature will rise above the extending temperature of the insulated actuating element 54 as bypass valve 16 approaches shutoff, and piston 80 will then continue to extend as the internal temperature of actuating element 54 catches up to its higher surrounding temperature, closing bypass valve 16 completely. It is also believed that an insulated actuating element 54 will be slow opening, its motion lagging behind the temperature of the rounding cooling-off water from which it is insulated. When actuating element 54 finally allows bias spring 56 to open bypass valve 16 and allow flow, the resulting rising temperature of the surrounding water will again, due to the insulation, not immediately affect it, allowing bypass valve 16 to stay open longer for a complete cycle of temperature rise. Such an "insulated" effect may also be accomplished by use of a wax mix that is inherently slower, such as one with less powdered copper or other thermally conductive filler. An actuating element 54 so altered can be manufactured with a somewhat lower set point temperature to make up for the lag, achieving whatever bypass valve 16 closing temperature desired.

An additional benefit of utilizing pump 32 in a cyclic mode in system 18 is that shut-off of a toggle action valve upon attainment of the desired temperature is enhanced by the differential pressure an operating pump 32 provides. If pump 32 continues to run as the water at water control valve 10 cools down, the pump-produced differential pressure works against re-opening a poppet type bypass valve 16. If pump 32 operates cyclically, powered only a little longer than necessary to get hot water to water control valve 10, it will be "of? before the water at bypass valve 16 cools down. When the minimum temperature is reached, actuating element 54 will retract, allowing bias spring 56 to open bypass valve 16 without having to fight a pump-produced differential pressure. Bypass flow will begin with the next pump "on" cycle. An additional benefit to the use of either a time-of-day or cyclic timer 40 or the above mentioned insulated actuating element 54 is that it improves the operating life of actuating element 54. Because use of either cyclic timer 40 or insulated element 54 causes cyclic temperature changes in bypass valve 16 (as opposed to maintaining an equilibrium setting wherein temperature is constant and actuating element 54 barely moves), there is frequent, substantial motion of the piston 80 in actuating element 54. This exercising of actuating element 54 tends to prevent the build-up of hard water deposits and corrosion on the cylindrical surface of actuator piston 80 and end face of poppet 78, which deposits could render bypass valve 16 inoperable.

Also inside bypass valve 16 can be an over-travel spring 58 disposed between the second side 90 of the actuator body 84 and a stop, such as retaining mechanism 62 shown in FIG. 2, located inside bypass valve 16 to prevent damage to a fully restrained actuating element 54 if it were heated above the maximum operating temperature of bypass valve 16 and to hold actuating element 54 in place during operation without concern for normal tolerance. Use of over-travel spring 58, which is not necessary for spool-type valves, allows movement of actuator body 84 away from the seated poppet 78 in the event that temperature rises substantially after poppet 78 contacts valve seat 70. Without this relief, the expanding wax could distort its copper can, destroying the calibrated set point. Over-travel spring 58 also holds bias spring 56, rod member 76 and actuator body 84 in place without the need to adjust for the stack-up of axial tolerances. Alternatively, actuating element 54 can be fixedly placed inside bypass valve 16 by various mechanisms known in the art, including adhesives and the like. Over-travel spring 58, if used, can be held in place by various internal configurations commonly known in the art, such as a molded seat (not shown).

Although there are a great many manufacturers and configurations of water control valves 10, it is believed that there are several generic forms of such valves that can be used to illustrate the present invention. The water control valves 10 adaptable for use with bypass valve 16, including but not limited to thermostatically controlled bypass valves, include various types of combination shower/tub valve 10. As such, these generic forms of water control valve 10 are utilized below to illustrate several different types of designs that are adaptable for the use of bypass valve 16 therewith according to the apparatus and system for retrofitting water control valve 10 of the present invention. The opportunity afforded by alt such water control valves 10 which this invention exploits is the access to the hot, cold and discharge ports when the existing valve cartridge is removed and replaced with an adapter plug configured according to the present invention, as discussed in detail below. The following examples are only representative of the types of water control valves 10 with which bypass valve 16 can be used according to the present invention. As is well known in the art, the individual manufacturers have various models of water control valves to incorporate desired features and preferences. The examples are for illustrative purposes only and are not intended to restrict the invention to particular uses, sizes or materials used in the examples.

As is well known, many homes have a combination shower and tub assembly whereby the same water control valve 10 is used to control the flow and temperature to the shower and the tub. A selector valve (not shown) is typically used to select the flow between the shower and the tub. An example shower/tub system is shown as 34 in FIG. 1. A similar water control valve to that shown as 10, is used for systems comprising only a shower or a tub, with the exception that such valve only has one discharge port (connected to either the shower or the tub). In the shower/tub system 34, water control valve 10, distributes water to shower head assembly 100 through shower line 102 and to tub spout 104 through tub line 106, as exemplified in the system of FIG. 1. A flow control handle 108 is used to control the flow and temperature of water to the shower head assembly 100 or tub spout 104. Although a single flow control handle 108 is shown in FIG. 1, it is understood that some shower, tub and shower/tub flow control valves utilize separate handles for the hot and cold water control. One of the primary distinguishing characteristics of virtually all existing shower/tub water control valves 10 is that they are positioned at least partially behind support wall 110 that forms part of the shower and/or tub enclosure and which is used to support shower head assembly 100 and tub spout 104. Because access to water control valve 10 is important for maintenance or repair of water control valve 10, even if positioned entirely behind support wall 110, water control valve 10 is generally placed behind an opening 112 in support wall 110 specifically configured for accessing water control valve 10. Typically a removable plate 114, commonly referred to as an escutcheon plate, is used to cover opening 112. To access water control valve 10, plate 114 is removed and valve 10 is maintained or repaired through opening 112 in support wall 110 and then plate 114 is reinstalled.

Figure 5:
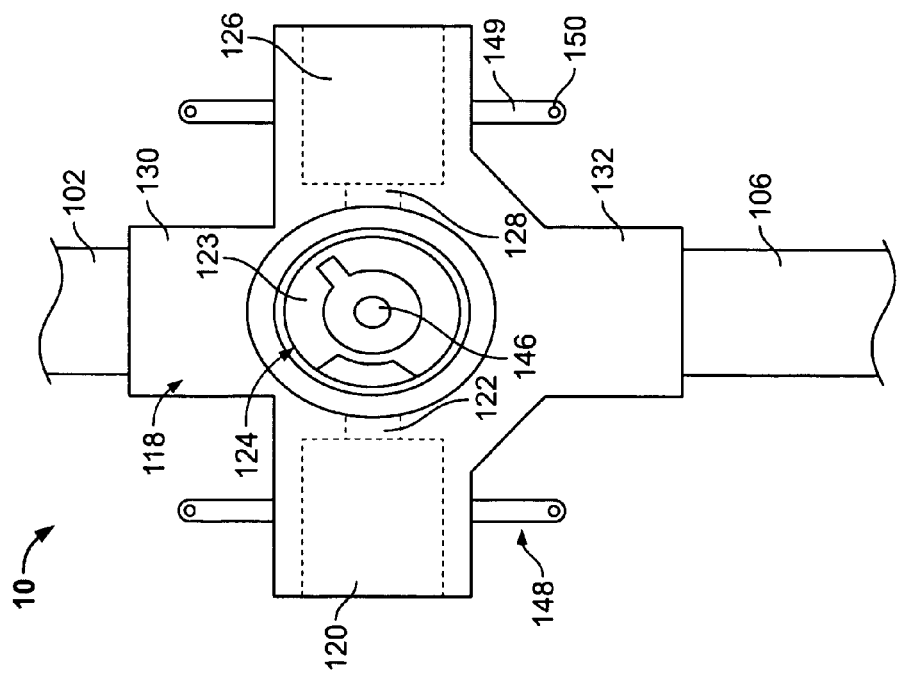
FIG. 5 is a front view of a prior art shower/tub water control valve showing a valve cartridge disposed in the valve manifold of the water control valve.

A typical tub/shower water control valve 10, such as the Peerless® valve shown in more detail in FIG. 5, is used to illustrate various configurations that are adaptable for retrofit use with bypass valve 16 according to the present invention. The typical water control valve 10 comprises a valve manifold (body/housing) 118 having a hot water inlet 120 that connects to hot water line 26 to allow hot water to flow through control valve hot passageway 122 to the inner valve workings, which generally comprise a removable valve cartridge 123 disposed inside cartridge receptor 124 of valve manifold 118, and a cold water inlet 126 that connects to cold water line 22 to allow cold water to flow through control valve cold passageway 128 to valve cartridge 123 inside cartridge receptor 124. Typically, cartridge receptor 124 is configured as a cylindrical or spherical cavity that is sized to receive valve cartridge 123 therein. Alternatively, cartridge receptor 124 may be configured as a generally flat surface on which valve cartridge 123 is mounted or attached (such as utilized in the American Standard model 6211 water control valve). In either configuration, as well as others, cartridge receptor 124 has three ports, one each for the inflow of hot and cold water from hot water line 26 and cold water line 22, respectively, and one for the discharge of mixed water to shower line 102 and/or tub line 106. When joined to cartridge mounting surface, valve cartridge 123 controls the' mix of hot and cold water to shower head assembly 100 or tub spout 104 through shower discharge 130 to shower line 102 or through tub discharge 132 to tub line 106, respectively. Tub/shower water control valves 10 intended for installation behind support wall 110 adjacent to shower system 34 have been and are commonly permanently or at least somewhat permanently plumbed into the water distribution system 16 such that valve manifold 118 is not replaceable without tearing out a wall and physically removing the valve manifold 118 (i.e., by sawing) from water distribution system 18. The dynamic seals and mating surfaces on the valving members that are subject to wear are generally internal to replaceable valve cartridge 123. For the dual handle designs, having separate handles for the hot and cold water valves, the faucet washer on a rising stem could be replaced, as could the valve stem, bonnet packing and valve seat. On the more modern water control valves, such as that shown as 10 in FIG. 5, the entire valve cartridge 123 is replaceable. Because all dynamic valving action is done internally in these modern cartridges, with only static seals on the exterior of valve cartridge 123, replacement of valve cartridge 123 replaces all of the seals and mating valving surfaces that are subject to wear. Modern two handle fixtures also utilize separate, replaceable hot and cold water cartridges. Many modern tub/shower valve cartridges 123, particularly the single handle designs, contain a balance piston device to sense and compensate for changes in the relative pressure levels of the hot and cold supply water, such as can occur when a toilet is flushed or a faucet is opened wide.

Figure 19:
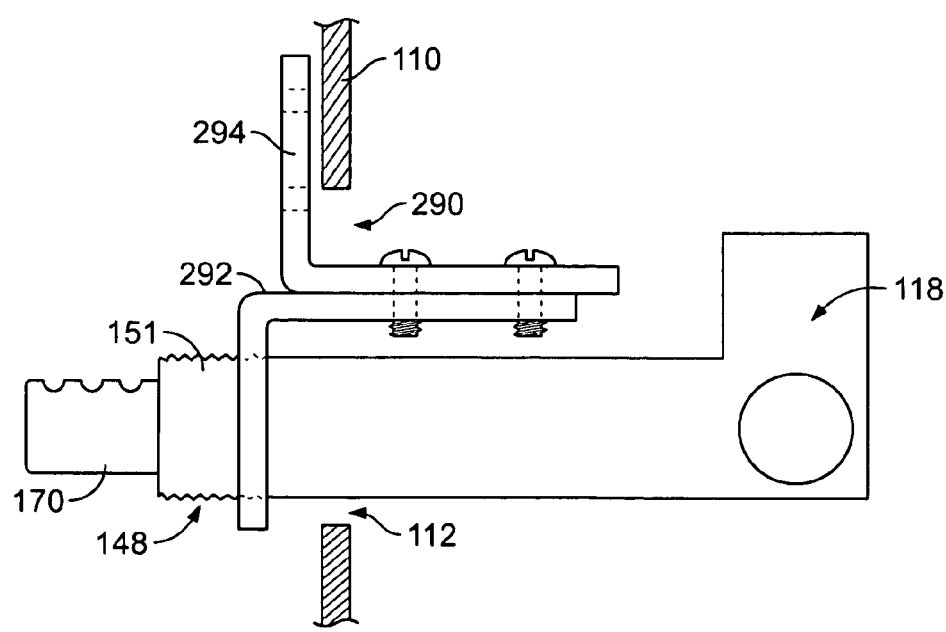
FIG. 19 is a side view of a second configuration of a bracket for use with the present invention shown attached to the valve manifold of a water control valve.

The replaceable valve cartridge 123 in modern control valves, an example of which is shown as 10 in FIG. 5, communicates with hot inlet port 134, cold inlet port 136 and discharge port 138 (shown in FIG. 6 with valve cartridge 123 removed) inside cartridge receptor 124 of valve manifold 118 through one or more fixed static seals, such as O-rings (not shown), on the exterior of valve cartridge 123. Ports 134, 136 and 138 form valve cartridge interface 140 inside cartridge receptor 124 that cooperates with valve cartridge 123 to transfer fluid from inlets 120 (hot) and 126 (cold) to discharges 130 (shower) and 132 (tub). In the example shown in FIG. 6, ports 134, 136 and 138 are positioned inside separate port cavities 142 that are configured to communicate with the end of valve cartridge 123 that is inserted inside cartridge receptor 124. Valve cartridge 123 is appropriately and cooperatively ported to flow water from hot water line 26 and/or cold water line 22 to shower discharge 130 and tub discharge 132. The opposite end of valve cartridge 123, which extends generally outwardly from cartridge receptor 124, as shown in FIG. 5, generally includes one or more mechanisms that cooperate with flow control handle 108 for selecting the relative amount of hot and cold water and for controlling the on/off and volume of flow to shower head 100 and/or tub spout 104, such as on/off/flow stem 146 which operatively connects to flow control handle 108 to allow the user to control the temperature and flow volume of water. For the control valve 10 shown in FIG. 5, as an example, on/off/flow stem 146 rotates for temperature control to turn the flow of water on and off. For many older configurations, stem 146 reciprocates to control the on/off and flow rate functions and rotates to control the water temperature. Attached to, connected to or part of the typical control valve 10, shown in FIG. 5, are one or more escutcheon mounting mechanisms 148 that are configured to removably mount escutcheon plate 114 so as to cover wall opening 112 with escutcheon plate 114. As shown in FIG. 5, escutcheon mounting mechanisms 148 can comprise tab members 149 having a threaded mounting hole 150 configured to removably receive a bolt, screw or other connecting device for holding escutcheon plate 114 over wall opening 112. Alternatively, mounting mechanism 148 can be configured with the outer end 151 of valve manifold 118 being threaded, as shown in FIG. 19, to receive escutcheon plate 114 having a large mating hole. Typically, a large single nut then clamps escutcheon plate 114 in place. The typical valve cartridge 123 also has one or more external sealing members, such as O-rings (not shown), that cooperate with wall 152 of cartridge receptor 124.

As known to those skilled in the art, water control valves 10 are available in many different configurations incorporating various design and operational preferences depending on the company, model, and/or desired features. Although such water control valves 10 may differ somewhat, such as various configurations for radially or axially disposed inlets and discharges, replaceable valve cartridge 123 generally has a first end (the insert end) that cooperates with valve cartridge interface 140, having hot 134, cold 136 and discharge 138 ports, a sealing mechanism (not shown) that cooperates with wall 152 of cartridge receptor 124 (those formed as a cavity), and a second end (the extending end) that cooperates with flow control handle 108. The way in which these components cooperate may be somewhat different depending on the manufacturer and/or model. For instance, the positioning of hot 134, cold 136 and discharge ports 138 at valve cartridge interface 140 generally varies by manufacturer and/or model of water control valve 10. In some brands/models of water control valve 10, valve cartridge interface 140 may have one or more, or all, of these ports positioned on wall 152 of the cavity that forms cartridge receptor 124 instead of on the bottom of the cavity shown in FIG. 6. As known to those skilled in the art, however ports 134, 136 and 138 are configured relative to cartridge receptor 124, valve cartridge 123 is appropriately ported so as to cooperate with ports 134, 136 and 138 of valve cartridge interface 140 so as to transfer water from hot water line 26 and/or cold water line 22 to shower line 102 and tub line 106 so as to deliver water to shower head 100 or tub spout 104, as selected by the user through operation of flow control handle 108, and appropriately configured to cooperate with flow control handle 108. Valve cartridge 123 may have internal channels or external channels, which cooperate with valve receptor 124 to provide the flow path, to move the water between inlet ports 134 (hot) and 136 (cold) to discharge port 138. Escutcheon mounting mechanisms 148 may be mounted, attached or otherwise cooperatively engaged with valve manifold 118 to secure escutcheon plate 114 over wall opening 112. The various improvement features, such as pressure balancing, are likewise incorporated differently in water control valve 10 by the different manufacturers and/or on different models by the same manufacturer.

Complete replacement of existing water control valves 10 installed behind support wall 110 is generally impractical, as it usually requires tearing out a large section of the shower support wall 110 (including any tile or fiberglass surfaces) and physically sawing through the existing plumbing to free the old valve manifold 118. At least a portion of the existing plumbing must then be replaced, including new union fittings added where threaded pipe is utilized. Additionally, at least a portion of support wall 110, with tile or other water-resistant covering, must then be reinstalled. The scope of this replacement work is beyond the capability or ambition of most homeowners and the cost to hire a contractor/plumber to do the work is generally so high as to be prohibitive to the typical homeowner. As such once a particular manufacturer's water control valve 10 is installed, it is very difficult to replace that valve 10 with one by a different manufacturer or even by a different model made by the same manufacturer. The purpose of the present invention is to allow retrofitting of existing water control valves 10 in tub/shower fixtures 34 with the newer features of instant hot water (i.e., through use of bypass valve 16 or others), pressure balance temperature regulation, anti-scalding and/or temperature sensitive mixing, as well as other possible features, without the need for replacing the installed/mounted component (i.e., the valve manifold 118) of the existing water control valve 10.

Figure 6:
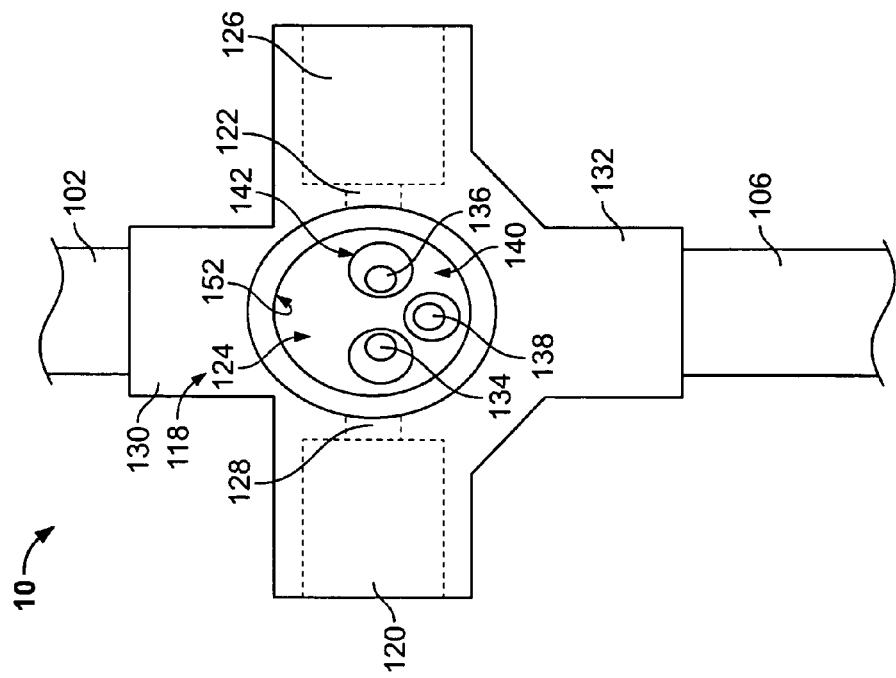
FIG. 6 is a front view of the prior art shower/tub water control valve of FIG. 5 showing the valve cartridge removed from the valve manifold to expose the valve cartridge interface of the water control valve.
Figure 7:
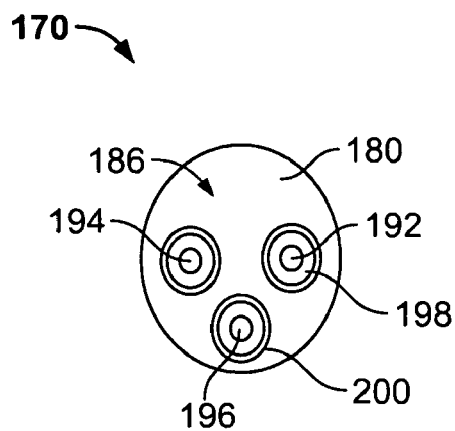
FIG. 7 is a front view of the first end of an adapter plug configured according to one embodiment of the present invention showing a configuration for the first plug interface.
Figure 8:
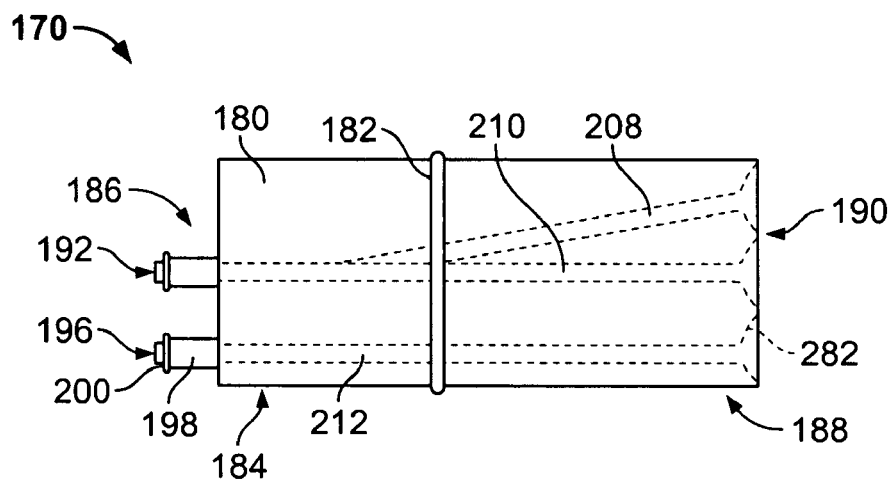
FIG. 8 is a side view of the adapter plug shown in FIG. 7.
Figure 9:
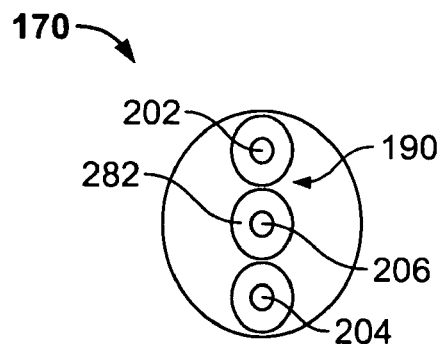
FIG. 9 is a front view of the second end of the adapter plug shown in FIG. 7 showing a configuration for the second plug interface.

The flow control handle 108, escutcheon plate 114 and valve cartridge 123 of the existing water control valve 10 are removed and discarded. Once these components are removed, thereby exposing valve cartridge interface 140 on or inside valve receptor 124 of valve manifold 118, an adapter plug 170, an example of which is shown in FIGS. 7 through 9, can be inserted inside or against valve receptor 124. The adapter plug 170 shown in these figures, is a simplified example of an adapter plug 170 that is configured to be utilized with a relatively larger size cavity for cartridge receptor 124, as shown in FIG. 6, so as to more easily illustrate and discuss the various features of the present invention. As set forth in more detail below, configurations of certain valve cartridge 123 and cartridge interface 140 will require a more compact design in order to accomplish these same objectives. The intent is to provide a retrofitting system, shown as 172 in FIG. 10, that includes an adapter plug 170 which is specifically configured for a particular make and model of existing water control valve 10, thereby providing for its particular cartridge interface 140 and cartridge receptor 124, so the user can then utilize a new, and typically improved, retrofit water control valve 174 to provide the desired flow control characteristics. In this manner, the user can relatively simply and quickly retrofit his or her shower/tub system 34 to include the various features that are currently available, such as the instant hot water and pressure balancing features discussed herein, without having to replace the valve manifold 118 that is fixedly installed in their water distribution system 18. Even if the water control valve 10 of the user's existing shower/tub system 34 has these features already, the use of the retrofit system 172 of the present invention allows the user the vastly improved flexibility to change from one manufacturer and/or model to another.

Figure 10:
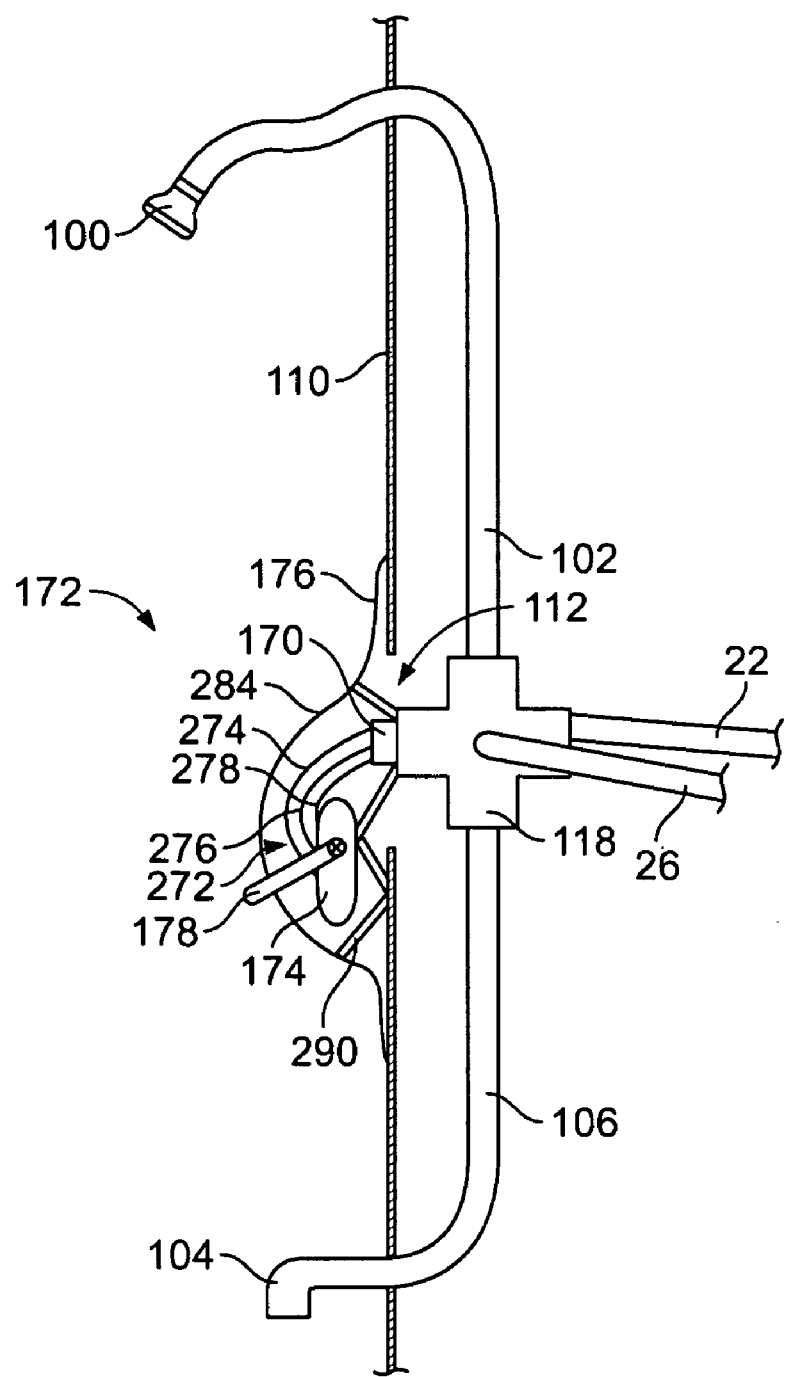
FIG. 10 is cross-sectional side view of a retrofit system configured according to the present invention with an escutcheon plate having a blister portion covering the exposed end of the adapter plug and the retrofit valve.

As shown in FIG. 10, adapter plug 170 of retrofit system 172 hydraulically connects to retrofit valve 174, which can be done at the time of installation unless they have been previously connected or they are configured integrally, and a modified escutcheon plate 176 and a new flow control handle 178 are utilized, as best shown in the retrofit system 172 of FIG. 10. In one preferred embodiment, adapter plug 170 comprises a plug body 180 that is sized and configured to be received in the cavity forming valve receptor 124 with generally, but not necessarily always, one or more plug sealing members, such as the O-ring shown as 182 in FIG. 8, disposed around the outer surface of plug body 180 to sealably interact with wall 152 of the cavity. In some configurations, no sealing members 182 will be required around plug body 180. At the first end 184 of plug body 180, the end which is inserted inside valve receptor 124 and placed against valve cartridge interface 140, is first plug interface 186 that is configured to connect to and cooperate with valve cartridge interface 140 so as to transfer fluid from valve manifold 118 to retrofit valve 174. At the second end 186 of plug body, the end which extends generally outwardly from valve receptor 124, is second plug interface 190. As explained in more detail below, second plug interface 190 is configured to hydraulically transfer fluid from adapter plug 170 to retrofit valve 174. As known to those skilled in the art, plug body 180 can be made out of a variety of different materials, including various plastics, metals and composites.

For the valve manifold 118 shown in FIGS. 5 and 6, with valve cartridge interface 140 shown in FIG. 6, first plug interface 186 can be configured as shown in FIGS. 7 and 8. In this configuration, first plug interface 186 comprises a first plug port 192, second plug port 194 and third plug port 196, each of which are disposed in a shaped spigot member 198 having a sealing member 200 (such as an o-ring) thereon for being sealably received in their respective port cavities 142 inside or on cartridge receptor 124. As known to those skilled in the art, other configurations of valve cartridge interface 140 will not require use of spigot members 198. When first plug interface 186 is engaged against valve cartridge interface 140, hot inlet port 134 is hydraulically connected to first plug port 192, cold inlet port 136 is hydraulically connected to second plug port 194 and discharge port 138 is hydraulically connected to third plug port 196 to transfer fluid between valve manifold 118 and adapter plug 170. Second plug interface 190 includes fourth plug port 202, fifth plug port 204 and sixth plug port 206, as best shown in FIG. 9, which are adapted to hydraulically connect, directly or indirectly, to retrofit valve 174. Interconnecting the ports on first plug interface 186 to the ports on second plug interface 190 are passageways, shown as first passageway 208, second passageway 210 and third passageway 212 in FIG. 8. First passageway 208 interconnects first plug port 192 with fourth plug port 202 to transfer hot water to retrofit valve 174, second passageway 210 interconnects second plug port 194 with sixth plug port 206 to transfer cold water to retrofit valve 174, and third passageway 212 interconnects third plug port 196 with fifth plug port 204 to transfer fluid from retrofit valve 174 to discharge port 138 on valve manifold 118, where it is transferred to shower line 102 and/or tub line 106 and then to shower head 100 and/or tub spout 104, respectively. As set forth below, some other configurations of adapter plug 170 will not have sufficient space for three round, parallel, straight (molded or drilled) internal passageways of sufficient size to transfer the desired fluids. For these adapter plugs 170, first 208, second 210 and third 212 passageways must be configured differently.

Figure 11:
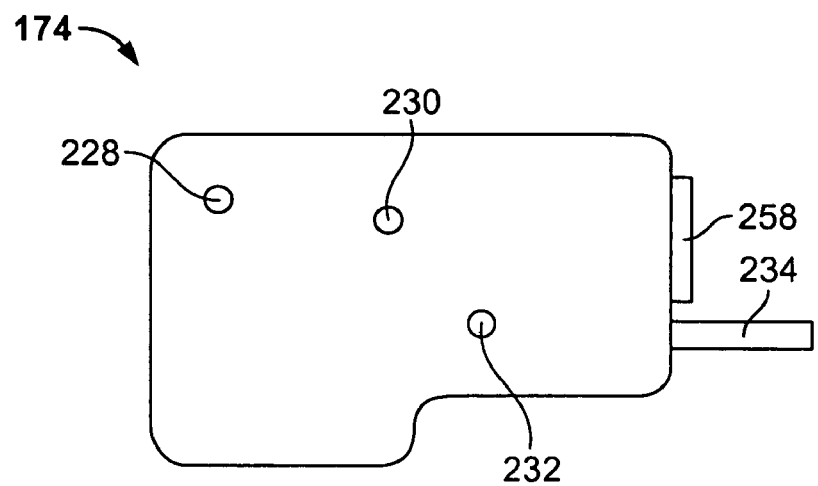
FIG. 11 is a side view of a retrofit valve configured according to one embodiment of the present invention showing the valve ports and stem of the retrofit valve.
Figure 12:
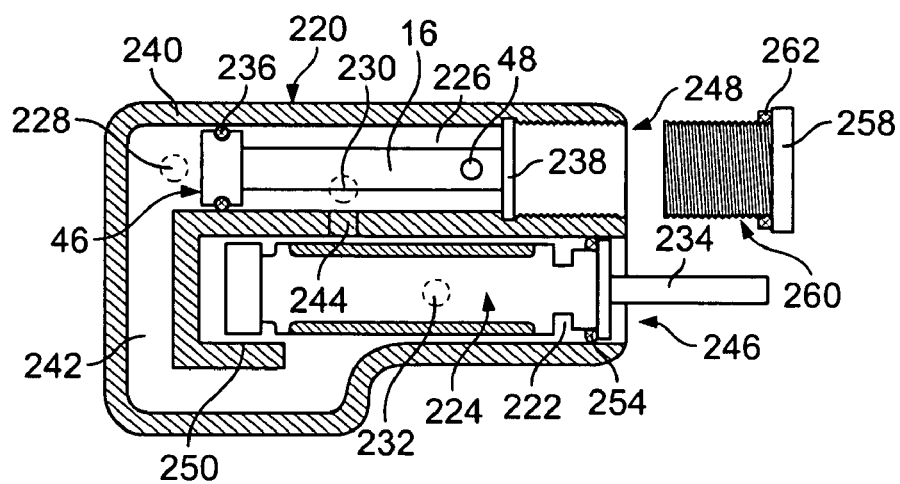
FIG. 12 is a cross-sectional side view of the retrofit valve shown in FIG. 11 showing the use of both a water control cartridge having a pressure balance function and a bypass valve.

Retrofit valve 174, best shown in FIGS. 11 and 12, has a valve body 220 that encloses a first fluid chamber 222, best shown in the cross-sectional view of FIG. 12, for receiving water control cartridge 224, which is configured to be operated by flow control handle 178 to mix hot and cold water for use in retrofit system 172. In a preferred embodiment, valve body 220 also encloses second fluid chamber 226 that is configured to receive bypass valve 16 and be in hydraulic connection with first fluid chamber 222, as explained below. As known to those skilled in the art, water control cartridge 224 can be a specially configured water control device that is configured to provide the desired operational features or water control cartridge 224 can be an "off-the-shelf" water control device that already includes the desired features, such as pressure balancing, anti-scalding and/or temperature sensitive mixing. Various manufacturers provide water control devices, presently in the form of valve cartridges 224, that include the pressure balancing in addition to the standard temperature mixing and on/off/flow control. One such device is Moen's Posi-Temp® cartridge. As known to those skilled in the art, pressure balancing is an important feature that maintains constant temperature even when the hot or cold water pressure varies (i.e., when the toilet is flushed, a sink valve is opened wide or other actions are taken that cause hot/cold water pressure variation). The retrofit system 172 of the present invention allows the user to select a different manufacturer for the upgrade to a new valving system with the desired features, such as pressure balancing.

As best shown in FIG. 11, retrofit valve 174 has a first valve port 228 that functions as a hot water inlet, a second valve port 230 that functions as a cold water inlet and a third valve port 232 that functions as the discharge port for discharging water to the shower head 100 and/or tub spout 104. Generally, but not necessarily always, first 228, second 230 and third 232 valve ports will be positioned for external access on valve body 220 of retrofit valve 174. Generally, as with current control valves 10, retrofit valve 174 will be sealed with an on/off/flow stem 234 of water control cartridge 224 extending therefrom to be operatively engaged by flow control handle 178. Although retrofit valve 174 having only a first fluid chamber 222 with the new water control cartridge 224 provides advantages for the typical shower/tub system 34, significant additional advantage can be obtained by including second fluid chamber 226 with bypass valve 16 therein for instant hot water availability. As discussed in more detail above, use of second fluid chamber 226 with bypass valve 16 therein, as shown in FIG. 12, provides hot water in the retrofit system 172 as soon as the user desires hot water, as selected by flow control handle 178.

In the embodiment shown in FIG. 12, bypass valve 16 includes sealing member 236 at or near bypass valve inlet 46 and support member 238 at or near bypass valve outlet 48. Sealing member 236 sealably interacts with valve wall 240 to close off flow from bypass channel 242, except through bypass valve 16, that interconnects first valve port 228 through which hot water is received in second fluid chamber 226. Sealing member 236 can be an O-ring mounted externally to bypass valve 16 or other like devices that are sufficient for preventing flow around bypass valve 16. Support member 238 should be sized and configured to support and center bypass valve 16 inside second fluid chamber 226. Second valve port 230, which connects to cold water line 22, can be positioned directly over cold water channel 244 or second fluid chamber 226. Under normal operating conditions (i.e., non-bypassing), hot or cooled off water enters retrofit valve 174 at first valve port 228 and cold water enters retrofit valve 174 at second valve port 230. The hot and cold fluids are mixed by water control cartridge 224, as selected by the user through operation of flow control handle 178, and then directed to third valve port 232 for discharge to, ultimately, shower head 100 and tub spout 104. Under the normal, non-bypassing condition hot water will wash across the face of screen 60 to clean it of any debris that collects thereon during bypass operations, making screen 60 self-cleaning. During bypass conditions, which occurs when the water in hot water line 26 (as determined at bypass valve inlet 46 in bypass channel 242) is cold or tepid, bypass valve 16 allows the cold or tepid water to flow through bypass valve 16, exit bypass valve outlet 48 and flow out retrofit valve 174 at second valve port 230 into, ultimately, cold water line 22. This "reverse" water flow through the cold water line 22 is accomplished by the pressure deferential supplied by pump 32, or other pressurizing means, in water distribution system 18. As soon as the water in bypass channel 242 reaches the desired hot temperature, bypass valve 16 closes, thereby preventing the hot water from flowing through bypass valve 16, returning retrofit system 172 to the normal operating condition (non-bypassing).

Figure 13:
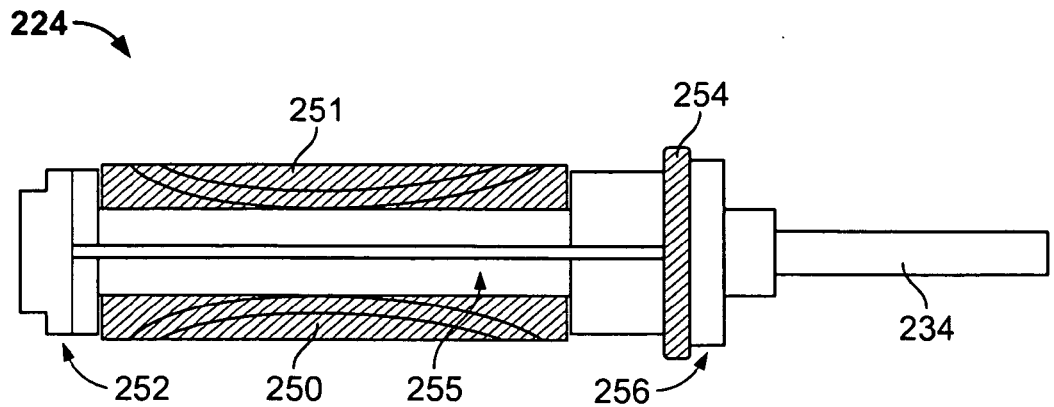
FIG. 13 is a side view of a prior art water control cartridge having a pressure balance function.
Figure 14:
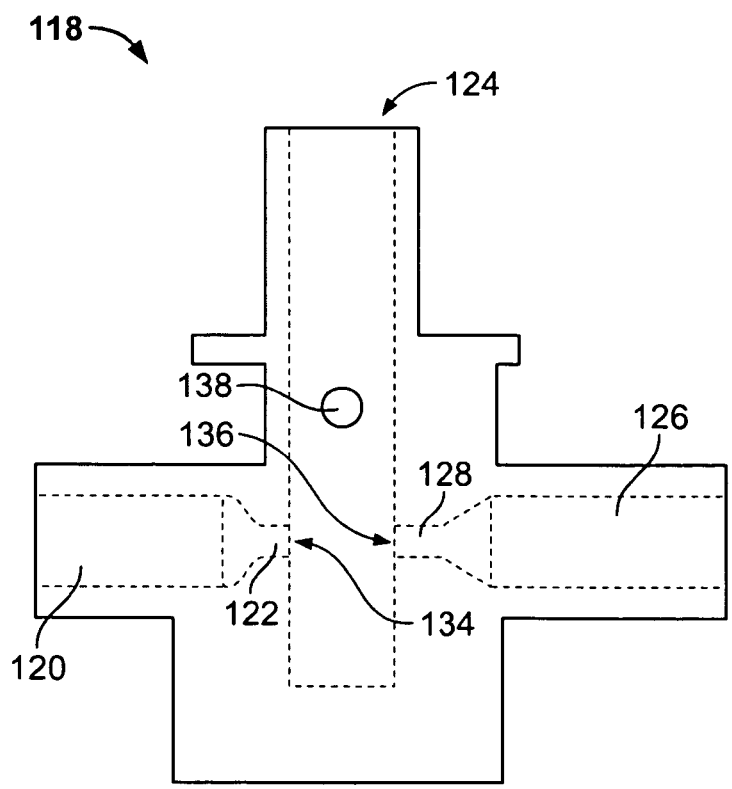
FIG. 14 is a side view of a prior art valve manifold.

In a preferred embodiment, shown in FIG. 12, retrofit valve 174 is configured such that both water control cartridge 224 and bypass valve 16 can be replaced without having to replace or remove retrofit valve 174 from retrofit system 172. As shown, this can be accomplished by providing retrofit valve 174 with a first opening 246 and a second opening 248 that open into first fluid chamber 222 and second fluid chamber 226, respectively. As best shown in FIG. 13 (which is Moen's model 1222 Posi-Temp® cartridge), water control cartridge 224, having a first end 252 and a second end 256, is provided with a first sealing member 254 at second end 256 so that water control cartridge 224 can be sealably placed inside first fluid chamber 222 (with first end 252 inserted first). The hot port on water control cartridge 224 is sealed to bypass channel 242 with cylindrically curved face seal 250. The cold port on water control cartridge 224 is sealed to cold water channel 244 with cylindrically curved face seal 251. This effectively isolates these ports from first fluid chamber 222. The discharge zone 255 between sealing member 254 and the two face seals 250 and 251 is the tub/shower discharge. Sealing member 254 can be an O-ring or other type of sealing mechanisms known to those skilled in the art. As known in the art, such as with many currently available valve cartridges 123 and water control cartridges 224, sealing member 254 should be configured to close off first fluid chamber 222 and prevent the flow of water out first opening 246. In the embodiment shown in FIG. 12, bypass valve 16 is inserted into second fluid chamber 226 through second opening 248 and a cap member 258 is utilized to close off second opening 248 into second fluid chamber 226. In one embodiment, cap member 258 comprises a threaded end 260 that is threadably received in second opening 248 and a cap sealing member 262, such as an O-ring, that provides a static seal to prevent fluid from flowing out retrofit valve 174 through second opening 248. As known to those skilled in the art, various other sealing mechanisms and closure mechanisms can be utilized to close bypass valve 16 and water control cartridge 224 inside retrofit valve 174. Alternatively, once these components are placed inside their respective fluid chambers, first 246 and second 248 openings can be fixedly closed. In another alternative, it may be possible and advantageous to manufacture retrofit valve 174 with all or a majority of the components of bypass valve 16 and/or water control cartridge 224 made integral with valve body 220.

As set forth above, various existing water control cartridges 224 made by various manufacturers could be suitable for use with retrofit valve 174 of the present invention. One such water control cartridge is shown in retrofit valve 174 in FIG. 12 and alone in FIG. 13. As known to those skilled in the art, this water control cartridge 224 includes a pressure balance feature that maintains the relative pressure between the hot and cold water flow when a the water distribution system 18 is subject to a sudden change in water pressure in the hot or cold water lines (i.e., as when a toilet is flushed or a water faucet is open wide). Water control cartridges having pressure balancing features have been known for many years. For instance, U.S. Pat. No. 2,308,127 to Symmons, U.S. Pat. No. 4,033,370 to Egli, U.S. Pat. No. 4,469,121 to Moen and U.S. Pat. No. 6,361,051 to Babin show various pressure balance configurations.

As also know to those skilled in the art, an anti-scalding device can be incorporated into the present invention to provide instant water shut-off if the temperature of the water exceeds a pre-set level. Although various manufacturers make such devices (typically they are utilized in shower head 100), they generally include a reset button to allow the user to manually resume water flow after the device is automatically activated. For the present invention, such a device can be included in retrofit valve 174, in addition to or instead of the pressure balancing feature discussed above, to block the flow of mixed water from retrofit valve 174 if the water temperature is too high (above the preset level). The reset button can be configured to protrude through retrofit valve 174 to be accessible to the user to resume fluid flow. Another possible improvement to the present invention, which can be utilized in addition to or instead of water control cartridge 224 with the pressure balancing feature, is an anti-scalding, proportional thermostatic water mixing and diverting valve (such as the Aquamix® available from Sparco, Inc. of Warwick, R.I.) that is a temperature sensitive mixing valve, as opposed to pressure sensitive, to maintain the water at or near a desired temperature under varied operating conditions (i.e., toilet flushing, sink valve opened, etc.). As such, the device provides both anti-scalding and anti-chilling through simultaneous control of the hot and cold water. The components of such a valve can be configured to fit inside of retrofit valve 174 to provide this feature to an existing water control valve 10 having valve manifold 118.

Figure 15:
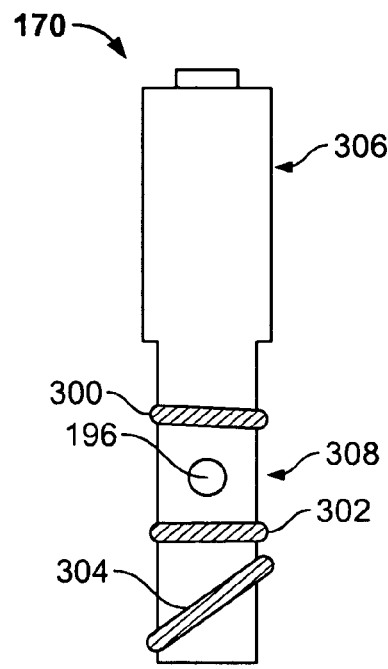
FIG. 15 is a side view of an adapter plug configured according to one embodiment of the present invention for the prior art valve manifold shown in FIG. 14.
Figure 16:
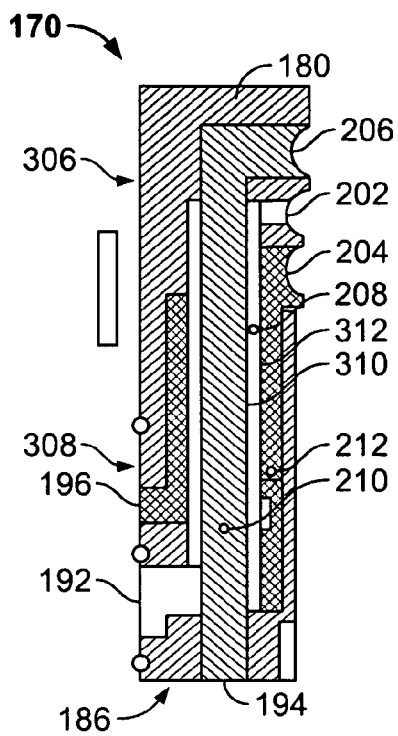
FIG. 16 is a cross-sectional side view of the adapter plug of FIG. 15.
Figure 17:
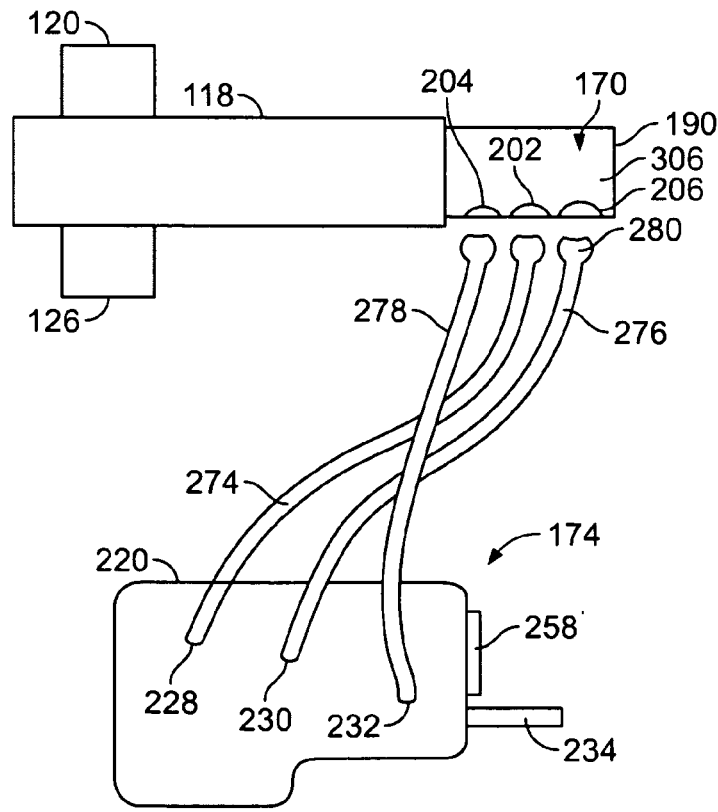
FIG. 17 is a side view one embodiment of a retrofit valve and fluid connectors according to the present invention shown with the adapter plug of FIG. 15 installed in the prior art manifold of FIG. 14.

Use of the present invention with a different model of control valve 10 is illustrated in FIGS. 14 through 17. One type of older design for valve manifold 118, shown in FIG. 14, has a longer, narrower cartridge receptor 124 than that illustrated in FIGS. 5 and 6, that is configured to cooperatively receive a longer, narrower valve cartridge 123. FIGS. 15 and 16 show an adapter plug 170 suitable for use with the valve manifold 118 shown in FIG. 14. As with current valve cartridges 123, adapter plug 170 includes one or more static seals, such as first static seal 300, second static seal 302 and third static seal 304 to isolate portions of adapter plug 170 to facilitate flow from/to hot inlet port 134, cold inlet port 136 and discharge port 138. As shown in FIGS. 16 and 17, an upper section 306 generally towards second end 188 of adapter plug 170 includes fourth plug port 202, fifth plug port 204 and sixth plug port 206 and is configured to generally extend outwardly from cartridge receptor 124, Lower section 308, generally towards first end 186 of adapter plug 170, is configured to be inserted into cartridge receptor 124 with first static seal 300 preventing fluid from flowing out cartridge receptor 124. Second static seal 302 isolates third plug port 196, which is in hydraulic communication with discharge port 138. Third static seal 304 separates first plug port 192 and second plug port 194, which are in hydraulic communication with hot inlet port 134 and cold inlet port 136, respectively. As shown in FIG. 16, internally adapter plug 170 comprises an inner, first tube 310 and a second tube 312 around first tube 310 to form first passageway 208 for the flow of hot water (or cooled/tepid water as the case may be), second passageway 210 for the flow of cold water and third passageway 212 for the flow of discharge water to, ultimately, shower head 100 and tub spout 104. In one embodiment plug body 180 comprises a two-piece stationary cylindrical sleeve.

Connecting adapter plug 170 inside valve manifold 118 with retrofit valve 174 are one or more fluid connectors 272 comprising a first conduit 274, second conduit 276 and third conduit 278, as shown in FIGS. 10 and 17. FIG. 17 shows adapter plug 170 as configured for an alternative design of tub/shower valve 10, shown in FIGS. 14, 15 and 16 and discussed above. First conduit 274 interconnects fourth plug port 202 to first valve port 228 to deliver the hot water (which may be cold or tepid) to retrofit valve 174. Second conduit 276 interconnects sixth plug port 206 to second valve port 230 to deliver cold water to retrofit valve 174 and to transfer the bypassed cold or tepid water away from retrofit valve. Third conduit 278 interconnects fifth plug port 204 to third valve port 232 to transfer water from retrofit valve 174 to, ultimately, shower head 100 and/or tub spout 104. In a preferred embodiment, three separate fluid connectors 272 are utilized, each one a rigid or conformable (i.e., flexible) tubular member. Alternatively, the present invention can utilize a single fluid connector 272 that has first 274, second 276 and third 278 conduits incorporated therein. As discussed in more detail below, fluid connectors 272 facilitate the placement of retrofit valve 174 behind escutcheon plate 176 by allowing for axial variation of its positioning, which may often be controlled by the other shower/tub components. Whether rigid or conformable, fluid connectors 272 can be made out of plastic, copper or various other metallic or non-metallic materials. For rigid fluid connectors 272, the ends thereof, which connect to second plug interface 190 of adapter plug 170 and to first 228, second 230 and third 232 valve ports on retrofit valve 174, can be configured to be removably attached to their respective ports. As an example, both ends of fluid connectors 272 can be configured to have an angularly adjustable, sealable end, such as can be achieved by utilizing spherical ends (shown as 280 for one end only in FIG. 17) fitted into hemispherical sockets, which are shown as 282 on FIGS. 8 and 9 for second plug interface, that are clamped and sealed with gland plates (not shown). This type of arrangement would allow the positioning of retrofit valve 174 to "float" with respect to accessible second plug interface 190 of adapter plug 170 during installation until the fasteners holding the gland plates are tightened, thereby clamping and sealing the adjustable joints at both ends of fluid connectors 272. Alternatively, one end of fluid connectors 272 can be fixedly attached to either adapter plug 170 or retrofit valve 174, as shown in FIG. 17 for the end attached to retrofit valve 174.

Although it is possible to configure the retrofit system 172 of the present invention such that both ends of fluid connectors 272 are fixedly attached to adapter plug 170 and retrofit valve 174, particularly with the use of flexible fluid connectors 272 to allow positioning of retrofit valve 174 during installation, this will generally not be the preferred configuration due to the loss of interchangeability with regard to different makes and models of water control valves 10. If it is desired to provide a retrofit system 172 that is configured for only a particular make/model of water control valve 10, then the present invention could be provided with a single adapter plug 170 and retrofit valve 174 for that make/model of control valve 10. In fact, if system flexibility is not necessary or desired, retrofit valve 174 can be configured to abut or otherwise directly connect first 228, second 230 and third 232 valve ports to fourth 202, sixth 206 and fifth 204 plug ports, respectively, with very short fluid connectors 272. In such cases, adapter plug 170 and retrofit valve 174 may be made as one integral component. Otherwise, it will generally be preferred to maintain interchangeability of retrofit system 272 by allowing use of a variety of differently configured adapter plugs 170 for differently configured water control valves' 10, which can best be achieved by having at least one end of fluid connectors 272, preferably the end that attaches to adapter plug 170, releasably connect to the other component (i.e., as shown in FIG. 17). As known to those skilled in the art, the releasable connection can be achieved by various mechanisms, including threaded ends and the like.

As shown in FIG. 10 and discussed above, adapter plug 170 is configured to be received inside or on valve manifold 118 and retrofit valve 174 is positioned relatively near adapter plug 170, both of which are located behind escutcheon plate 176. To accommodate the increased axial displacement, relative to cartridge receptor 124, escutcheon plate 176 has an outwardly extending blister portion 284, as shown in FIG. 10. As known in the art, the axial placement of the existing installed shower valve manifold 118 with respect to the plane of the shower/support wall 110 varies from one old installation to another, generally depending on plumbing tolerances and the whim of the installing plumber. Later renovations, such as the addition of tile or shower stall panels, will also cause major variation with regard to the axial location of cartridge receptor 124 relative to support wall 110. These variations will cause the axial location, from the plane of support wall 110, of the accessible end of adapter plug 170 (i.e., second plug interface 190), to likewise vary. Preferably, retrofit valve 174 should be at some fixed location with respect to the plane of support wall, which would preferably be against or very near support wall 110 to allow the use of escutcheon plate 176 having the shallowest possible depth for blister 284 so that it will not intrude as far into the shower/tub space. Because most modern water control cartridges 224 are longer than wide, it is likely to be preferred that retrofit valve 174 be positioned such that the axial direction of water control cartridge 224 is generally parallel to the plane of surface wall 110 and thus perpendicular to adapter plug 170. In this configuration, retrofit valve 170, as well as escutcheon plate 176, can be attached to and physically supported by support wall 110. This will provide a rigid and sturdy support for flow control handle 178, which is attached to stem 234, which the user will actuate to control the temperature and flow of water from shower head 100 and tub spout 104. Connecting retrofit valve 174 and/or escutcheon plate 176 directly to valve manifold 118 and/or adapter plug 170 (with their varying axial protrusions) presents many difficulties, particularly with regard to the need to install escutcheon plate 176 substantially flush against support wall 110.

Figure 18:
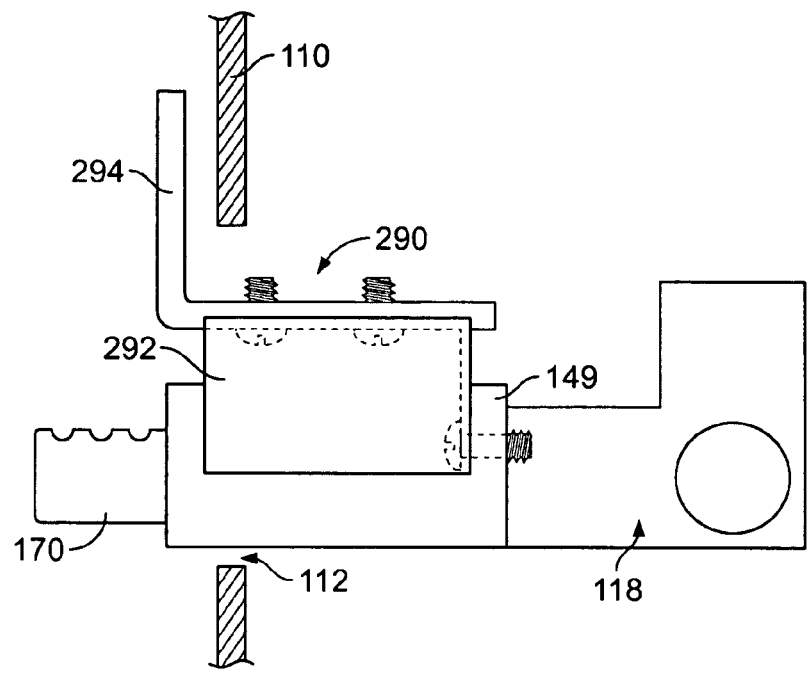
FIG. 18 is a side view of one configuration of a bracket for use with the present invention shown attached to the valve manifold of a water control valve.
Figure 20:
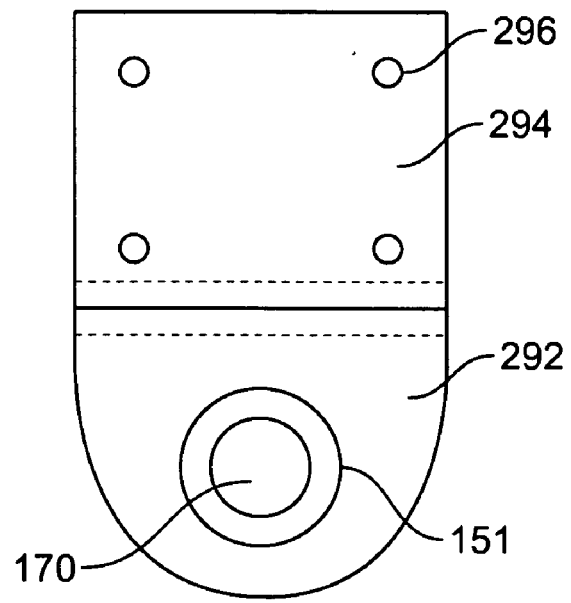
FIG. 20 is a front view of the bracket shown in FIG. 19.
Figure 21:
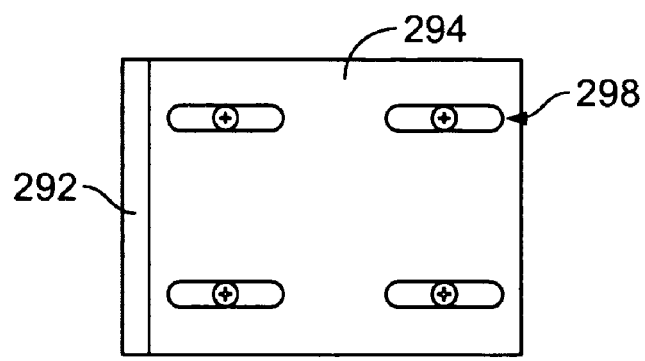
FIG. 21 is a top view of the second bracket member of the bracket shown in FIG. 20.

In a preferred embodiment, retrofit system 172 will utilize bracket 290 for securely mounting and positioning retrofit valve 174 and escutcheon plate 176 relative to adapter plug 170, as shown in FIGS. 18 through 21. Additional physical support may be gained by utilizing an adhesive or other attachment mechanism to attach to wall 110. In one configuration, best shown in FIGS. 18 and 19, bracket 290 is configured with one or more first bracket members 292 that attach to escutcheon mounting mechanisms 148 associated with valve manifold 118 of the existing water control valve 10. As stated above, mounting mechanisms 148 are generally attached to, part of, connected to or cooperating with valve manifold 118, as shown in FIGS. 18 and 19. Bracket 290 can also be configured with one or more second bracket members 294 that are configured to provide a support for securely attaching retrofit valve 174 and/or escutcheon plate 176. As shown in FIG. 20, second bracket member 294 can be configured with one or more mounting holes 296 to receive an attachment mechanism, such as a screw or bolt, to hold retrofit valve 174 and escutcheon plate 176 in place. In one configuration, retrofit valve 174 attaches to second bracket member 294 and escutcheon plate 176 attaches to one or more lugs (not shown) on retrofit valve 174. The preferred embodiment of bracket 290 also includes an adjustment mechanism 298 that is configured to allow the user to adjust the axial displacement (i.e., distance from wall) for retrofit valve 174 and escutcheon plate 176. In one well known configuration, adjustment mechanism can comprise a plurality of elongated holes and screws in second bracket member 294 that cooperate with a like number of holes, not elongated, in first bracket member 292 to allow the installer to slide second bracket member 294 forwards and backwards to obtain the position he or she desires. Although bracket 290 can be manufactured out of a variety of different materials, including metals, plastic, composites and the like, a sturdy metal bracket 290 is likely preferred to provide the support necessary for the user to utilize flow control handle 178 without flexing or breaking bracket 290.

Escutcheon plate 176, like the existing escutcheon plate 114, is configured to cover the opening 112 in support wall. In addition, as stated above, escutcheon plate 176 includes blister 284 to provide an enclosure for the accessible portion of adapter plug 170 (i.e., the second plug interface 190), retrofit valve 174, fluid connectors 272 and bracket 290. Retrofit system 172 can include a single, uniform escutcheon plate 176 that is suitable for most, if not all, retrofit systems 172, thereby adding to the uniformity of retrofit system 172. A hole (not shown) should be provided in escutcheon plate 176, for instance in the blister 284, for on/off/flow stem 234 to extend through so that it may connect to flow control handle 178. Shower systems 34 having two handle valves will require a different configuration for escutcheon plate 176. Escutcheon plate 176 can be made out of a variety of materials, such as brass, plated steel, stainless steel and/or zinc, as desired for the consumer's shower system 34.

Flow control handle 178 is configured to actuate retrofit valve 174 so as to allow the user to control the temperature) volume and on/off of water through shower head 100 and/or tub spout 104. As stated above, stem 234 will protrude through escutcheon plate 176 (i.e., blister 284). A short lever-like flow control handle 178, as shown in FIG. 10, attached to stem 234 will allow approximately 180 degrees of rotation to accomplish the on/off and temperature adjustment of retrofit valve 174. In one embodiment, the plane of motion for the flow control handle 178 will be perpendicular to support wall 110 and in either a vertical or horizontal plane, depending on whether a vertical or horizontal orientation of retrofit valve 174 is deemed to provide the most aesthetically pleasing appearance for blister 284 and the most natural manual motion to actuate retrofit valve 174. Preferably, the length of flow control handle 178 is kept relatively short to limit encroachment in the shower/tub space, such as that common with existing shower control valves 10.

To retrofit an existing shower/tub fixture 34 to obtain the features of the retrofit system 172 of the present invention, the person installing the system 172 turns off the water supply to the house or other facility and removes the existing flow control handle 108 and escutcheon plate 114 to expose valve manifold 118 mounted in the water distribution system 18. Unlike prior art replacement of water control valve 10, there is no need for the user to remove or replace the existing valve manifold 118. The user removes valve cartridge 123 from valve receptor 124, which is typically a cavity as shown, of valve manifold 118 to expose valve cartridge interface 140. Flow control handle 108, escutcheon plate 114 and valve cartridge 123 can be discarded. Adapter plug 170, configured for the particular type of valve manifold 118 and valve cartridge interface 140 installed in water distribution system 18, is inserted into or against cartridge receptor 124 such that first plug interface 186 hydraulically connects to valve cartridge interface 140. If necessary, adapter plug 170 is secured in place with a screw, I bonnet ring or other fasteners. The user then mounts bracket 290 to at least one of the one or more mounting mechanisms 148 associated with valve manifold 118. In some configurations, bracket 290 may be installed with adapter plug 170 or it may have its own fastening method and hardware. In other configurations, adhesives or other attachment mechanisms may be utilized, The user then connects the one or more fluid connectors 272, which has a first conduit 274, second conduit 276 and third conduit 278 and may be compliant or rigid, between second plug interface on adapter plug 170 and first, 228, second 230 and third 232 valve ports on retrofit valve 174 to hydraulically interconnect adapter plug 170 and retrofit valve 174. In some configurations, one or both ends of the elongated fluid connectors 272 may be fixedly attached to either or both of adapter plug 170 and/or retrofit valve 174. If universality of the present invention is not desired, such that it is configured to replace a particular make and model of water control valve 10, then both ends of fluid connectors 272 can be fixed (i.e., one end to adapter plug 170 and the other end to retrofit valve 174). If retrofit valve 174 is provided separate from bracket 290, then the user secures retrofit valve 174 to bracket 290, preferably adjusting the installation so the axial centerline of retrofit valve 174 is substantially parallel to support wall 110 and placed against or spaced apart from support wall 110 per instructions for the particular configuration. Bracket 290 or retrofit valve 174 may be adhesively or otherwise attached to wall 110. If necessary, the installer then secures all compliant or adjustable ends of fluid connectors 272 (i.e., those having gland devices or other fasteners) to seal the ends of fluid connectors to the respective adapter plug 170 and/or retrofit valve 174. The new escutcheon plate 176 is then mounted to bracket 290 such that the blister portion 284, if any, covers the exposed end of adapter plug 170 and retrofit valve 174 and stem 234 of water control cartridge 224 in retrofit valve 174 extends generally outwardly through escutcheon plate 176. The user then attaches, typically using a setscrew or other type of fastener, the new flow control handle 178 to stem 234 to provide operational control to retrofit valve 174. The user then should be able to operate his or her retrofit system 172 with the enhanced features of the new retrofit valve, such as instant hot water provided by bypass valve 16 and/or pressure balancing. All of which is accomplished without removing or replacing the existing valve manifold that is fixedly mounted in the water distribution system.

Figure 22:
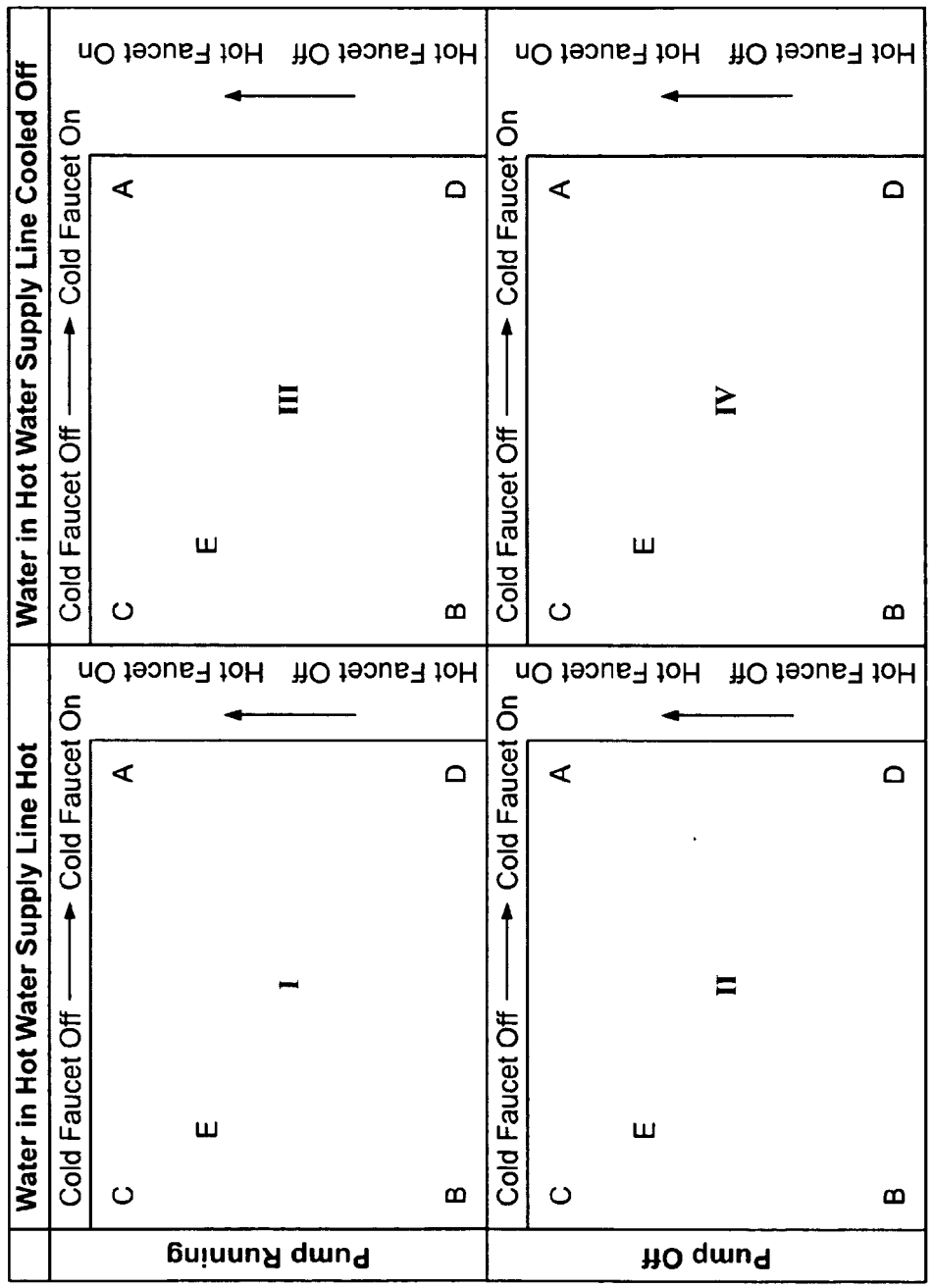
FIG. 22 is a chart showing the operational characteristics of the preferred thermostatically controlled bypass valve of the present invention when in use with a water distribution system.

With regard to the use of a thermostatically controlled bypass valve 16 having the components shown in FIGS. 2 through 4 and described in the accompanying text, the operation of the bypass valve 16 of the present invention is summarized on the chart shown as FIG. 22. The chart of FIG. 22 summarizes the results of the twenty combinations of conditions (pump on/pump off; hot water line hot/hot water line cooled off; hot water valve fully open, closed or between; cold water valve fully open, closed or between) that are applicable to the operation of bypass valve 16. The operating modes IVB, IVC, IVD, IIIB, & IIID are summarized detailed in the immediately following text. The operation of the remaining fifteen modes are relatively more obvious, and may be understood from the abbreviated indications in the outline summarizing FIG. 22.

Starting with the set "off hours (normal sleeping time, and daytime when no one is usually at home) pump 32 will not be powered. Everything will be just as if there were no pump 32 and no bypass valve 16 in use with retrofit valve 174 (i.e., both the cold and hot water lines will be at the same city water pressure). The water in hot water line 26 and at bypass valve 16 will have cooled off during the long interim since the last use of hot water. The reduced water temperature at bypass valve 16 results in "retraction" of rod member 76 of the thermally sensitive actuating element 54. The force of bias spring 56 pushing against flange 82 on rod member 76 will push it back away from valve seat 68, opening bypass valve 16 for recirculation. Although the thermal actuating element 54 is open, with pump 32 not running, no circulation flow results, as the hot 26 and cold 22 water lines are at the same pressure. This is the mode indicated as IVB in the outline on FIG. 22. If the cold water valve at retrofit valve 174 is opened, with thermal actuating element 54 open as in mode IVB above, pressure in cold water line 22 to the cold water side of retrofit valve 174 will drop below the pressure in hot water line 26. This differential pressure will siphon tepid water away from the hot side to the cold side, which is the mode indicated as IVD in the outline on FIG. 22. The recirculation of the "hot" water will end when the tepid water is exhausted from the hot water line 26 and the rising temperature of the incoming "hot" water causes actuating element 54 to close.

If the hot water side of retrofit valve 174 is turned on with actuating element 54 open as in mode IVB above, pressure in hot water line 26 will drop below the pressure in cold water line 22. This differential pressure, higher on the cold side, will load check valve 64 in the "closed" direction allowing no cross flow. This is mode IVC in the outline on FIG. 22. In this mode, with hot water line 26 cooled and pump 32 off, a good deal of cooled-off water will have to be run Gust as if bypass valve 16 were not installed), to get hot water, at which time actuating element 54 will close without effect, and without notice by the user. With actuating element 54 open and hot water line 26 cooled-off as in mode IVB above, at the preset time of day (or when the cyclic timer trips the next "on" cycle) pump 32 turns on, pressurizing the water in hot water line 26. Pump pressure on the hot side of retrofit valve 174 results in flow through the open actuating element 54, thereby pressurizing and deflecting check valve 64 poppet away from its seat to an open position. Cooled-off water at the boosted pressure will thus circulate from the hot line 26 through actuating element 54 and check valve 64 to the lower pressure cold water line 22 and back to water heater 24. This is the primary "working mode" of the bypass valve 16 and is the mode indicated as IIIB in the outline on FIG. 22. If the cold water valve is turned on during the conditions indicated in mode IIIB above (i.e., pump 32 operating, hot water line 26 cooled off, and the hot water valve at retrofit valve 174 turned off) and while the desired recirculation is occurring, mode IIID will occur. A pressure drop in the cold water line 22 due to cold water flow creates a pressure differential across valve 16 in addition to the differential created by pump 32. This allows tepid water to more rapidly bypass to cold water line 22. When the tepid water is exhausted from hot water line 26, actuating element 54 will close, ending recirculation.

Explanation of FIG. 22 Table

Mode I: Water in Hot Water Supply Line Hot, Pump On.

A. Hot and cold water valves fully open. Pressure drops from hot and cold flow about equal. Actuating element 54 stays closed. No leak or recirculation in either direction.

B. Hot and cold water valves fully closed. Actuating element 54 keeps bypass valve 16 closed. No recirculation.

C. Hot water valve fully open, cold water valve closed. Actuating element 54 closed. Check valve 64 closed. No recirculation. No leak.

D. Hot water valve closed, cold water valve fully open Actuating element 54 closed. No recirculation. No leak.

E. Hot and cold water valves both partially open in any combination Actuating element 54 closed. No recirculation. No leak.

Mode II: Water in Hot Water Supply Line Hot, Pump Off.

A. Hot and cold water valves full on. Pressure drops from hot and cold flow about equal. Actuating element 54 stays closed.

B. Hot and cold water valves fully closed. Actuating element 54 keeps bypass valve 16 closed. No recirculation.

C. Hot water valve fully open, cold water valve closed. Actuating element 54 closed. Check valve 64 closed. No recirculation. No leak.

D. Hot water valve closed, cold water valve fully open Actuating element 54 closed. No recirculation. No leak.

E. Hot and cold water valves both partially open in any combination. Actuating element 54 closed. No recirculation. No leak.

Mode III: Water in Hot Water Line Cooled Off, Pump On.

A. Hot and cold water valves full open. Flow-induced pressure drops about equal, bypass valve 16 stays open and allows recirculation hot to cold until tepid water is exhausted and hotter water closes actuating element 54. If both sides of water control valve are discharging to the same outlet they are mixing hot and cold anyway. If the valves being manipulated are at remote fixture on the same plumbing branch, this short time tepid-to-cold leak will probably not be noticeable. If valves being manipulated are on remote branches of plumbing, the mixing would have no effect.

B. Hot and cold water valves fully closed. Actuating element 54 open, get desired tepid-to-cold recirculation until hot water line 26 heats up.

C. Hot water valve fully open, cold water valve closed. Actuating element 54 open but pressure drop in hot water line 26~negate pump pressure, stopping recirculation. Check valve 64 stops cold to hot leak.

D. Hot water valve closed, cold water valve fully open. Actuating element 54 open, get tepid to cold recirculation until hot line heats up.

E. Hot and cold water control valves both partially open in any combination. Could get tepid to cold leak. If valves are at same fixture don't care as mixing hot and cold anyway. If at remote fixture probably not noticeable. Tepid to cold leak would be short term.

Mode IV: Water In Hot Water Supply Line Cooled Off, Pump Off.

A. Hot and cold water valves full open. Flow-induced pressure drops about equal, bypass valve 16 stays open and may allow recirculation (leak) hot to cold until tepid water is exhausted and hotter water closes actuating element 54. Don't care, if both valves are at same fixture as are mixing hot and cold anyway. If water control valves being manipulated are at remote fixtures on the same plumbing branch, this short time tepid-to-cold leak would probably not be noticeable. If water control valves being manipulated are on remote branches of plumbing, mixing would not be noticeable.

B. Hot and cold water valves fully closed. Actuating element 54 open, no recirculation.

C. Hot water valve fully open, cold water valve fully closed Actuating element 54 open. Check valve 64 closed. No leak D. Hot water valve closed. Cold water valve fully open. Bypass valve 16 open, tepid to cold recirculation until actuating element 54 heats up and closes.

E. Hot and cold water valves both partially open, in any combination. Could get tepid to cold leak. If water control valves at same fixture, don't care as mixing hot and cold anyway. If at remote fixture probably not noticeable. Tepid to cold leak would be short term.

Figure 23:
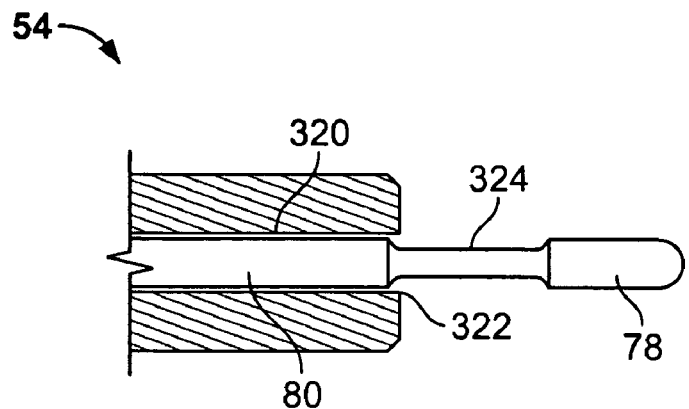
FIG. 23 is a side cross-sectional view of a modified thermal actuator showing modifications to reduce potential problems with lime buildup.

Several further enhancements have been developed for the thermal valve actuating element 54, which are applicable to the above-described bypass valve 16 are shown in FIG. 23. It has been noted that "lime" or "calcium" buildups on piston 80 can cause sticking of piston 80 in actuating element 54. Manufacturers of these actuating elements 54 recommend use of an elastomer boot or a nickle-teflon coating on piston 80, or use of a plastic piston 80. A preferred material may be use of a plastic piston 80, to which the buildup could not get a tenacious hold, and the removal of the internal chamfer at the open end of guide bore 320 and replacement with a sharp corner 322, as shown in FIG. 23. Removal of the chamfer and replacement with corner 322 would provide a sharper scraping edge to clean piston 80, and would eliminate a place where the detritus could become wedged. In addition to the chamfer removal, another simple geometry change to' piston 80 might be very effective. As shown in FIG. 23, a long shallow groove 324 in or a reduced diameter of piston 80 that would extend from just inside guide bore 320 (at full extension) to just outside guide bore 320 at full retraction would provide a recess to contain buildup for a long period. Once this recessed area filled up with lime, edge 322 of guide bore 320 could scrape off the incrementally radially extending soft build up relatively easily, as compared to scraping off the surface layer that bonds more tenaciously to the metal.

The most direct method to overcome sticking due to mineral buildup is to optimize actuator force in both directions. Buildup of precipitated minerals on the exposed outside diameter of the extended piston 80 tends to prevent retraction, requiring a strong bias spring 56. This high bias spring force subtracts from the available extending force however, thereby limiting the force available to both extend piston 80 against the mineral sticking resistance and to effect an axial seal between poppet 78 and seat 70. When water temperature is high, piston 80 is extended so that its surface is exposed. Deposition also occurs primarily at high temperatures, so that buildup occurs on piston 80 outside diameter, resulting in sticking in the extended position when the growth on the piston outside diameter exceeds guide 320 interior diameter. Significantly more than half of the available actuator force thus can most effectively be used to compress bias spring 56, resulting in a maximum return force.

Figure 24:
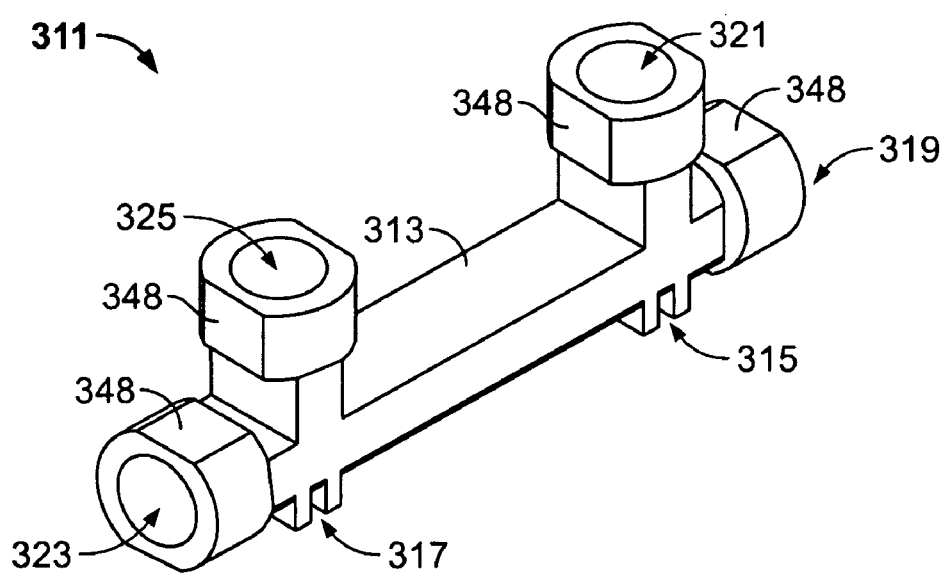
FIG. 24 is a perspective view of an assembled thermostatically controlled bypass valve formed in accordance with an embodiment of the present invention.
Figure 25:
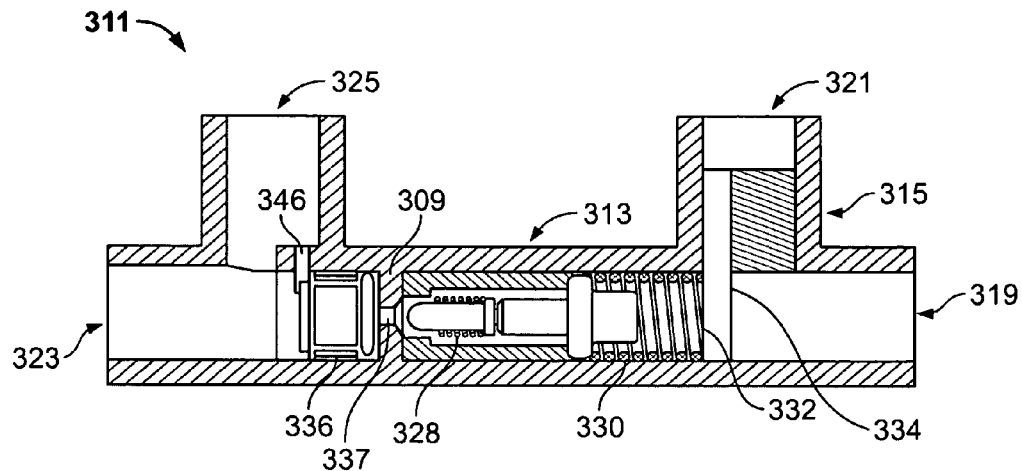
FIG. 25 is a cross-sectional side view of the bypass valve in FIG. 24.
Figure 26:
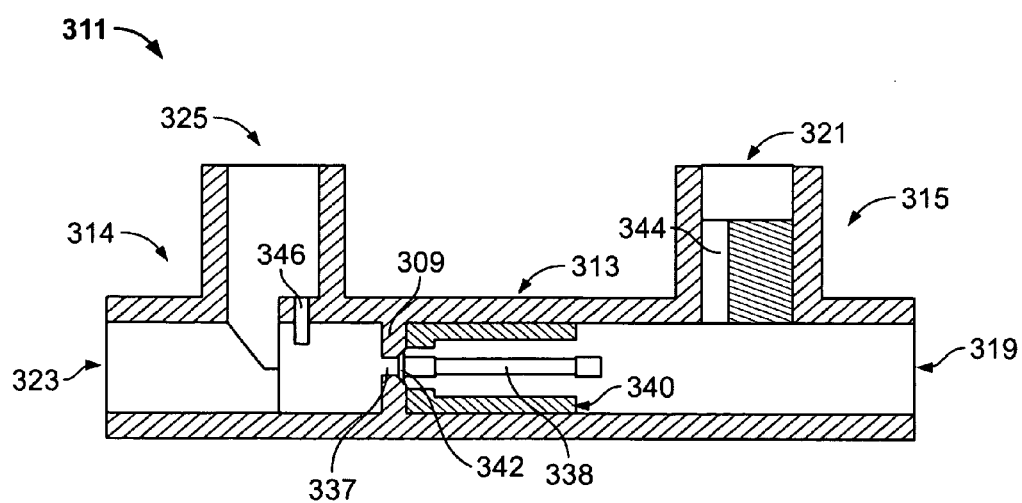
FIG. 26 is a cross-sectional side view of the valve body of the bypass valve of FIG. 24.

FIGS. 24 through 30 illustrate an alternative embodiment of the present invention that is designated generally as 311. As best shown in FIGS. 24 through 26, bypass valve 311 comprises a valve body 313 having a first end 315, a second end 309 and a separating wall 309 disposed between first end 315 and second end 309. First end 315 is designated to receive and discharge hot water and second end 309 is designated to receive and discharge cold water from a source of cold water, such as a city water supply system or a local water well. Valve body 313 has four threaded ports, an axial and radial port at the first end 315 and an axial and radial port at the second end 309. For purposes of discussion herein, the axial ports are designated as inlet ports and the radial ports are designated as discharge ports, however, it will be understood from the discussion set forth below that the invention is not so limited.

At the first end 315 (the hot water side) is first inlet port 319 and first discharge port 321 and at the second end 309 (the cold water side) is second inlet port 323 and second discharge port 325. Conversely, the radial ports can be the inlet ports and the axial ports can be the discharge ports. As discussed in detail below, the first 319 and second 323 inlet ports connect to the hot and cold water distribution system and first 321 and second 325 discharge ports connect to the hot and cold water valves on the fixture (i.e., sink, shower, bathtub or etc.) with which the bypass valve 311 is utilized. The use of both an inlet 319 and discharge 321 ports on the hot side distinguish the present invention from other known bypass valves, which utilize a single port, and provide significant benefits for bypass valve 311. The bypass valve 311 reduces the number of plumbing fittings (at least one tee) and plumber time for installation by allowing it to be connected simply with swivel nut hoses. Because the "tee" function is internal to valve body 313, hot water flowing to the open fixture valve flows through valve body 313, around the thermal actuator body, allowing immediate response to rising temperature. Conversely, if the tee is an external pipe fitting remote from the thermal bypass valve, response will be slowed. This use of an integral tee shortens time in which water can be siphoned from cold to hot, eliminating the need for an internal check valve. Hot water flowing through valve body 313 to an open fixture also allows placement of a screen inside the valve body 313 such that it is swept clean. The use of the second port on the hot side also allows placement of a retaining pin without the need for an extra seal. The use of two ports on the cold side (i.e., inlet port 323 and discharge port 325) also eliminates the use of an external tee and further simplifies and reduces the cost of installing the bypass valve 311. In addition, two ports on the cold side also facilitate the use of a retaining slot for holding a check valve, if one is used.

As best shown in FIG. 25 and discussed in more detail below, valve body 313 houses a thermally sensitive actuating element 326, bias spring 328, an over-travel spring 330, screen 332, retaining pin 334 and check valve 336. Valve body 313 can most economically and effectively be manufactured out of a molded plastic material, such as Ryton®, a polyphenylene sulphide resin available from Phillips Chemical, or a variety of composites. Molded plastic materials are preferred due to their relatively high strength and chemical/corrosion resistant characteristics while providing the ability to manufacture the valve body 313 utilizing injection molding processes with the design based on the configuration described herein without the need for expensive casting or machining. Alternatively, valve body 313 can be manufactured from various plastics, reinforced plastics or metals that are suitable for "soft" plumbing loads and resistant to hot chlorinated water under pressure. As shown in FIGS. 25 and 26, first end 315 of valve body 313 is molded with wall 309 having a passage 337 therein interconnecting first end 315 and second end 309 to allow fluid to flow therethrough, a set of axially oriented fin guides 338 having ends that form an internal shoulder 340 inside valve body 313 for fixedly receiving and positioning one end of thermal actuating element 326 and the bias spring 328, and a retaining pin hole 344 for receiving retaining pin 334. Second end 309 is molded with retaining slot 346 for engagement with the snap-in check valve 336. The valve body 313 is designed so the components can fit through either of the inlet and/or discharge ports, which will typically be one-half inch diameter. In this manner, a one piece bypass valve 311 results with no intermediate or additional joints required for installation.

For ease of installation of the bypass valve 311 by the user, each of the four ports (319, 321, 323 and 325) on valve body 313 have one-half inch straight pipe threads for use with the swivel nuts that are commonly found on standard connection hoses that fit the typical residential faucet. The threads on all four ports are molded with flats or axial slots 348 interrupting the threads to prevent a user from attempting to mount valve body 313 directly to "hard" plumbing with female taper pipe threads. The swivel nuts on the connection hoses seal with hose washers against the ends of the four ports, as opposed to common pipe fittings that seal at the tapered threads. These four ports can be marked "hot in", "hot out", "cold in", and "cold out" as appropriate to provide visual indicators for the do-it-yourself installer so as to avoid confusion. In the preferred installation of bypass valve 311, inlet port 319 connects to the hot water angle stop at the wall and the discharge port 321 connects to the hot water faucet. Inlet port 323 connects to the cold water angle stop and discharge port 325 connects to the cold water faucet. In actuality, the two hot hoses can be interchanged on the two hot ports (ports 319 and 321), as can the two cold hoses on the cold ports (ports 323 and 325).

Figure 27:
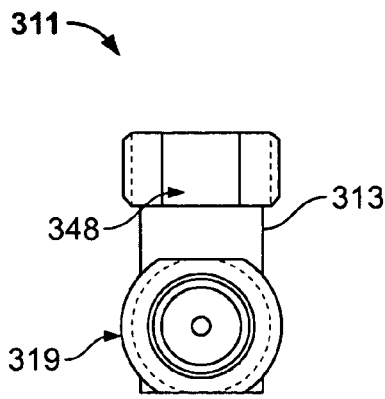
FIG. 27 is an end view of the second end of the valve body of the bypass valve of FIG. 24.
Figure 28:
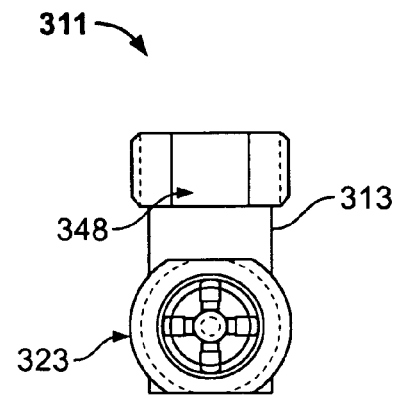
FIG. 28 is an end view of the first end of the valve body of the bypass valve of FIG. 24.
Figure 29:
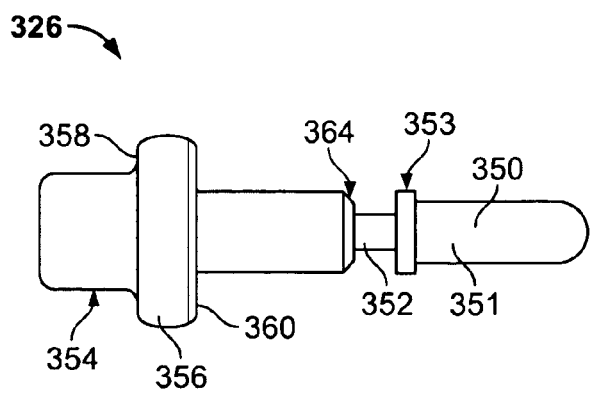
FIG. 29 is a side view of the thermally sensitive actuating element for use in the bypass valve of FIG. 24.

Thermally sensitive actuating element 326 is preferably of the wax filled cartridge type, also referred to as wax motors, having an integral piston/poppet rod member 350, as best shown in FIG. 27. Rod member 350 comprises poppet 351 attached to piston 352 with an intermediate flange 353 thereon. The end of poppet 351 seats against valve seat 342 to close passage 337. The body 354 of actuating element 326 has a section 356 of increased diameter to seat against shoulder 340 in valve body 313. As shown in FIG. 25, over-travel spring 330 abuts against first side 358 of actuator body 354 and second side 360 of actuator body abuts against shoulder 340. Piston 352 of rod member 350 interconnects poppet 351 with actuator body 354. Actuating element 326 operates in a conventional and well known manner. Briefly, actuating element 326 comprises a wax or a mixture of wax and metal powder (i.e., copper powder) enclosed in actuator body 354 by means of a membrane made of elastomer or the like. Upon heating the wax or wax with copper powder mixture slowly expands, thereby pushing piston 352 and poppet 351 of rod member 350 in an outward direction. Upon cooling, the wax or wax/copper powder mixture contracts and rod member 350 is pushed inward by bias spring 328 until flange 353 contacts actuator body 354 at actuator seat 364. Although other types of thermal actuators, such as bimetallic springs and memory alloys (i.e., Nitinol and the like) can be utilized, the wax filled cartridge type is preferred because the wax can be formulated to change from the solid to the liquid state at a particular desired temperature. The rate of expansion with respect to temperature at this change of state is many times higher, resulting in almost snap action of the wax actuating element 326. The temperature set point is equal to the preset value, such as 397 degrees Fahrenheit, desired for the hot water. This is a "sudden" large physical motion over a small temperature change. As stated above, this movement is reacted by bias spring 328, which returns rod member 350 as the temperature falls.

Although not entirely demonstrated in early tests, it is believed that beneficial "toggle" action can be achieved with a bypass valve 311 of very simple mechanical design. If the motion of the thermal actuator 326 is made to lag behind the temperature change of the water surrounding it by placing suitable insulation around the actuator 326 or by partially isolating it from the water, then instead of slowly closing only to reach equilibrium at a low flow without reaching shutoff, the water temperature will rise above the extending temperature of the insulated actuator 326 as the valve approaches shutoff, and the piston 350 will then continue to extend as the internal temperature of the actuator 326 catches up to its higher surrounding temperature, closing the valve 311 completely. It is also believed that an insulated actuator 326 will be slow opening, its motion lagging behind the temperature of the surrounding cooling-off water from which it is insulated. When actuating element 326 finally begins to open the valve 311 and allow flow, the resulting rising temperature of the surrounding water will again, due to the insulation, not immediately affect it, allowing the bypass valve 311 to stay open longer for a complete cycle of temperature rise. Such an "insulated" effect may also be accomplished by use of a wax mix that is inherently slower, such as one with less powdered copper or other thermally conductive filler. An actuator 326 to be installed with insulation can be manufactured with a somewhat lower set point temperature to make up for the lag, allowing whatever valve 311 closing temperature desired.

Also inside valve body 313 is an over-travel spring 330, disposed between the first side 358 of the actuator body 354 and a stop located inside valve body 313 to prevent damage to a fully restrained actuator 326 heated above the bypass valve's 311 maximum operating temperature and to hold the actuator 326 in place during operation without concern for normal tolerance. Over-travel spring 330 allows movement of the actuator body 354 away from the seated poppet 351 in the event that temperature rises substantially after the poppet 351 contacts seat 342. Without this relief, the expanding wax would distort its copper can, destroying the calibrated set point. The over-travel spring 330 also holds the bias spring 328, rod member 350 and actuator body 354 in place without the need to adjust for the stack-up of axial tolerances. Alternatively, actuator 326 can be fixedly placed inside valve body 313 by various mechanisms known in the art, including adhesives and the like. Over-travel spring can be held in place by various internal configurations commonly known in the art, such as a molded seat. In the preferred embodiment, however, over-travel spring 330 abuts against screen 332, which is held in place by cantilevered retention pin 334. Screen 332 can be a small wire fabric, mesh-type screen that is shaped and configured to fit within the first end 315 of valve body 313. Screen 332 is utilized to keep hard water lime particles and other detritus out of bypass valve 311 and to act as a seat for the over-travel spring (as explained above). Screen 332 is positioned inside valve body 313, as shown in FIG. 25, at the intersection of first inlet port 319 and first discharge port 321 so as to have its surface swept clean each time the hot water faucet is turned on. The retention pin 334 is to hold screen 332, as well as the other components, in place inside valve body 313. Retention pin 334 is installed in valve body 313 through first discharge port 321 so as to abut screen 332, thereby eliminating the need for an extra external seal.

In an alternative embodiment of the present invention, a snap-in cartridge check valve 336 is located in the second end 309 of valve body 313, as shown in FIG. 25, to prevent siphoning of cold water through the bypass valve 311 when only the hot water faucet is on, and at a high flow rate, prior to the hot water temperature rising. The preferred embodiment does not use the check valve because at very low flow rates the check valve will tend to chatter, which is a common problem with check valves.

Figure 30:
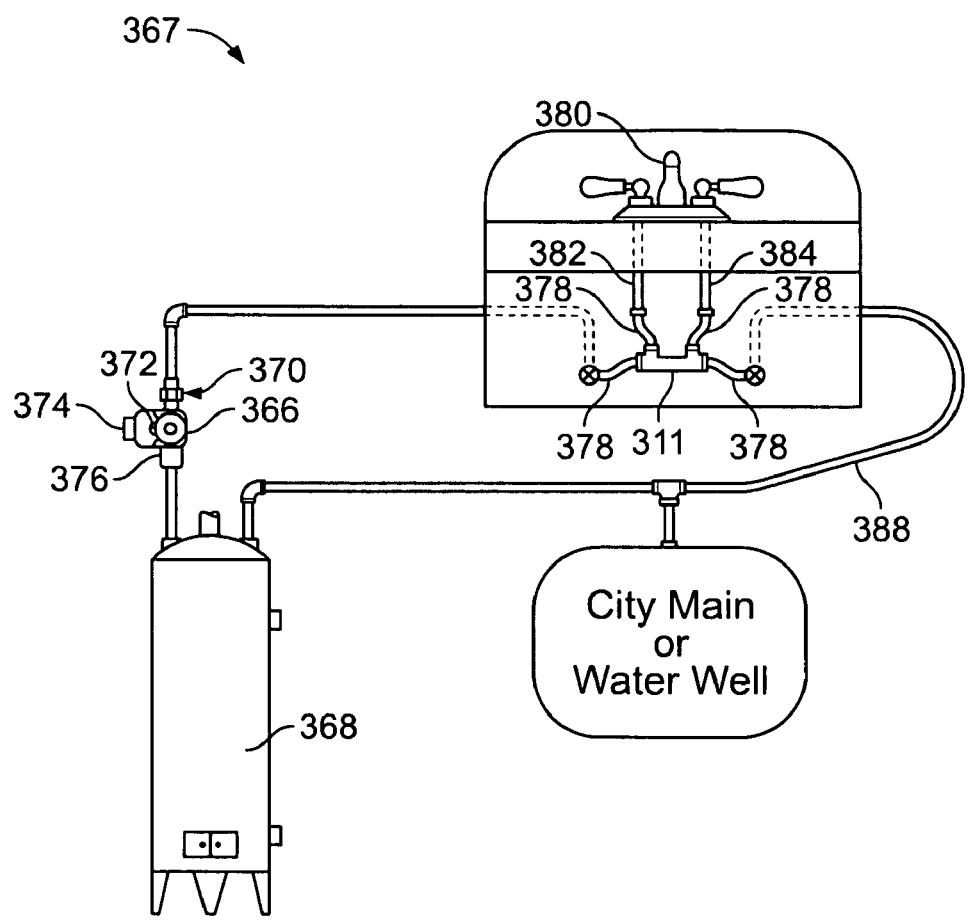
FIG. 30 is a side elevation view showing a water distribution system and fixture utilizing the bypass valve of FIG. 24

In order to achieve the desired circulation flow, a single circulating pump 366 is utilized as part of a water circulating system 367, as shown in FIG. 30. Pump 366 can be a single, small pump of the type used in residential hot water space heating. In fact, a very low flow/low head pump is desirable, as a larger (i.e., higher head/higher flow) pump mounted at the typical domestic water heater 368 tends to be noisy. This annoying noise is often transmitted by the water pipes throughout the house. In addition, if the shower (as an example) is already in use when pump 366 turns on, whether the first start or a later cyclic turn-on, the sudden pressure boost in the hot water line from a larger pump can result in an uncomfortable and possibly near-scalding temperature rise in the water at the shower head or other fixture in use. The smaller boost of a "small" pump (i.e., one with a very steep flow-head curve) will result in only a very small and less noticeable increase in shower temperature. In the preferred embodiment, the single, small pump 366 needs to provide only a flow of approximately 0.3 gpm at 1.0 psi pressure. In accordance with pump affinity laws, such a "small" pump requires a very small impeller or low shaft speed. The inventors have found that use of a very small impeller or low shaft speed also precludes formation of an air bubble in the eye of the impeller, which bubble may be a major cause of noise. Such a small steep curve pump will, however, constitute a significant pressure drop in the hot water line when several fixture taps are opened simultaneously (such as a bathtub and the kitchen sink). To avoid reduced flow, a check valve 370 can be plumbed in parallel with pump 366 or incorporated within the pump housing, to pass a flow rate exceeding the pump's capacity around pump 366. When pump 366 is powered and flow demand is low, check valve 370 prevents the boosted flow from re-circulating back to its own inlet. With check valve 370 plumbed around pump 366, it is advantageous to place an orifice 372 in the pump discharge to provide a simple manner to achieve the desired very steep flow-head curve from available stock pump designs. A single pump 366 located at or near the water heater 368 in its discharge piping will boost the pressure in the hot water pipes somewhat above that in the cold water pipes (i.e., perhaps one to three feet of boost).

With this arrangement only one pump 366 per plumbing system (i.e., per water heater) is required with any reasonable number of remote faucet sets (i.e., the typical number used in residences) equipped with bypass valves 311. This is in contrast to those systems that require multiple pumps, such as a pump at each fixture where bypassing is desired.

If desired, pump 366 can operate twenty-four hours a day, with most of the time in the no flow mode. However, this is unnecessary and wasteful of electricity. Alternatively, pump 366 can have a timer 374 to turn on the pump 366 daily at one or more times during the day just before those occasions when hot water is usually needed the most (for instance for morning showers, evening cooking, etc.) and be set to operate continuously for the period during which hot water is usually desired. This still could be unnecessary and wasteful of electricity. Another alternative is to have the timer 374 cycle pump 366 on and off regularly during the period when hot water is in most demand. The "on" cycles should be of sufficient duration to bring hot water to all remote fixtures that are equipped with a bypass valve 311, and the "off" period would be set to approximate the usual time it takes the water in the lines to cool-down to minimum acceptable temperature. Yet another alternative is to equip pump 366 with a normally closed flow switch 376 sized to detect significant flows only (i.e., those flows that are much larger than the bypass valve 311 flows), such as a shower flowing. For safety purposes, the use of such a switch 376 is basically required if a cyclic timer 374 is used. The switch can be wired in series with the pump motor. If the switch indicates an existing flow at the moment the timer calls for pump on, the open flow switch will prevent the motor from starting, thereby avoiding a sudden increase in water temperature at the fixture (i.e., a shower) being utilized. The use of such a switch accomplishes several useful objectives, including reducing electrical power usage and extending pump life if hot water is already flowing and there is no need for the pump to operate, avoiding a sudden temperature rise and the likelihood of scalding that could result from the pump boost if water is being drawn from a "mixing" valve (such as a shower or single handle faucet) and allowing use of a "large" pump (now that the danger of scalding is eliminated) with its desirable low pressure drop at high faucet flows, thereby eliminating the need for the parallel check valve 370 required with a "small" pump.

By using a time-of-day control timer 374, pump 366 operates to maintain "instant hot water" only during periods of the day when it is commonly desired. During the off-cycle times, the plumbing system operates just as if the bypass valves 311 and pump 366 were not in place. This saves electrical power usage from pump operation and, more importantly, avoids the periodic introduction of hot water into relatively uninsulated pipes during the off-hours, thereby saving the cost of repeatedly reheating this water. The time-of-day control also avoids considerable wear and tear on pump 366 and the bypass valves 311. Considerable additional benefits are gained by using a cyclic timer 374, with or without the time-of-day control. In addition to saving more electricity, if a leaky bypass valve or one not having toggle action is used, there will be no circulating leakage while the pump is cycled off, even if the valve fails to shut off completely. Therefore, a simple (i.e., one not necessarily leak tight) valve may suffice in less demanding applications. Having the leakage reduced to just intermittent leakage will result in reduced warming of the cold water line and less reheating of "leaking" recirculated water. In addition, shut-off of a toggle action valve upon attainment of the desired temperature is enhanced by the differential pressure an operating pump provides. If pump 366 continues to run as the water at the bypass valve 311 cools down, the pump-produced differential pressure works against re-opening the valve. If pump 366 operates cyclically, powered only a little longer than necessary to get hot water to bypass valve 311, it will be "off" before the valve 311 cools down. When the minimum temperature is reached, the thermal actuator 326 will retract, allowing the bias spring 328 to open the valve 311 without having to fight a pump-produced differential pressure. Bypass flow will begin with the next pump "on" cycle. An additional benefit to the use of either a time-of-day or cyclic timer 374 is that it improves the operating life of thermal actuator 326. Because use of either timer 374 causes cyclic temperature changes in valve 311 (as opposed to maintaining an equilibrium setting wherein temperature is constant and the actuator barely moves), there is frequent, substantial motion of the piston 350 in thermal actuator 326. This exercising of actuator 326 tends to prevent the build-up of hard water deposits and corrosion on the actuator piston 350 and poppet face, which deposits would render the valve 311 inoperable.

In the preferred embodiment, bypass valve 311 is manufactured from a one-piece molded valve body 313 that is configured as described above with fin guides 338, internal shoulder 340, passage 337, retaining pin hole 344 and retaining slot 346 for ease of manufacture and reduced manufacturing costs. The bias spring 328, wax cartridge actuating element 326 with its piston/poppet rod member 350, the over-travel spring 330 and screen 332 are placed into the "hot" axial port (the first inlet port 319) in that order. Screen 332 is pushed against the over-travel spring 330 compressing it, thereby making room for insertion of the retaining pin 334 through the retaining pin hole 344 at the "hot" radial port (the first discharge port 321). The cartridge check valve 336, if utilized, is inserted into the "cold" axial port (the second inlet port 323) and snaps into place in retaining slot 346.

Installation of the bypass valve 311 is also made easy by manufacturing the valve 311 in the configuration as set forth above. As discussed, valve body 313 is molded with four ports (designated as 319, 321, 323 and 325). to allow installation with commonly used under-sink (as an example) vinyl hoses or flexible metal pipe, shown as 378 in FIG. 30, having swivel ends and faucet washers. The inlet ports 319 and 323 on valve body 313 are formed with one-half inch straight pipe threads to allow the installer to remove the end of the wall shut off-to-faucet hoses (hot and cold) at the faucet 380 and connect those ends, which are commonly one-half inch straight pipe threads, to valve inlets 319 and 323. The valve discharge ports 321 and 325 are likewise molded with one-half inch straight pipe threads to allow connection from them to the hot 382 and cold 384 inlets at faucet 380. The threads on all four ports will seal only with hose washers and swivel nuts. Because the use of a plastic valve body 313 is envisioned, the inability to mount valve body 313 directly to "hard" plumbing with taper pipe threads insures that the body 313 will be connected only with flexible lines 378, thereby precluding any plumbing loads that might overstress the non-metallic body. Because all current American faucets 380 are equipped with one-half inch straight pipe threads, the recommended procedure is to remove the pair of existing connection hoses 378 from the faucet 380 and connect these loose ends to the appropriate inlet ports 319 and 323 of valve body 313. The angle stop valves at the wall may have any of several possible thread size connections, or may have permanently connected hoses or tubes. As a result, it is best not to disturb these wall connections, but instead use hoses 378 to connect from the angle stop to bypass valve 311. A new set of hoses 378 with one-half inch straight pipe thread swivel nuts at both ends can then be connected from discharge ports 321 and 325 of valve body 313 to the appropriate hot 382 and cold 384 water connections on faucet 380.

While there is shown and described herein certain specific alternative forms of the invention, ft will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use.

What is claimed is:

1. A retrofit valve system for a valve manifold mounted in a water distribution system having a source of cold water, a source of hot water and a water control fixture, said valve manifold having a cartridge cavity with a valve cartridge interface comprising a hot water inlet port, a cold water inlet port and a discharge port, said retrofit valve system comprising:
an adapter plug having a plug body with a first end and a second end, a first plug interface at said first end and a second plug interface at said second end, said first end of said adapter plug inserted into said cartridge cavity of said valve manifold, said first plug interface hydraulically connected to said valve cartridge interface, said adapter plug further comprising a plurality of passageways interconnecting said first plug interface and said second plug interface;
a retrofit valve hydraulically connected to said adapter plug, said retrofit valve having a valve body with a first fluid chamber in said valve body; and
a water control cartridge disposed in said first fluid chamber of said retrofit valve, said water control cartridge configured to mix water from said source of cold water and said source of hot water and discharge water to said water control fixture.

2. The retrofit valve system according to claim 1, wherein said first plug interface comprises a first plug port, a second plug port and a third plug port and said second plug interface comprises a fourth plug port, a fifth plug port and a sixth plug port.

3. The retrofit valve system according to claim 2, wherein said plurality of passageways comprises a first passageway, a second passageway and a third passageway.

4. The retrofit valve system according to claim 3, wherein said first passageway interconnects said first plug port and said fourth plug port, said second passageway interconnects said second plug port and said sixth plug port and said third passageway interconnects said third plug port and said fifth plug port.

5. The retrofit valve system according to claim 4, wherein said first plug port is hydraulically connected to said hot water inlet port, said second plug port is hydraulically connected to said cold water inlet port and said third plug port is hydraulically connected to said discharge port.

6. The retrofit valve system according to claim 5 further comprising one or more static seals on said adapter plug to hydraulically isolate each of said first plug port, said second plug port and said third plug port.

7. The retrofit valve system according to claim 1 further comprising an escutcheon plate and a flow control handle, said escutcheon plate configured to cover said adapter plug and said retrofit valve, said flow control handle operatively attached to said water control cartridge.

8. The retrofit valve system according to claim 6, wherein said water control cartridge comprises a stem extending generally outwardly from said retrofit valve through said escutcheon plate, said flow control handle attached to said stem.

9. The retrofit valve system according to claim 6, wherein said escutcheon plate comprises a blister portion, said blister portion adapted to cover said adapter plug and said retrofit valve.

10. The retrofit valve system according to claim 6 further comprising a bracket, said bracket configured to support said escutcheon plate and said retrofit valve.

11. The retrofit valve system according to claim 10, wherein said bracket is configured to support said retrofit valve such that the axial centerline of said retrofit valve is substantially perpendicular to said cartridge cavity.

12. The retrofit valve system according to claim 1 further comprising one or more fluid connectors interconnecting said adapter plug and said retrofit valve, said one or more fluid connectors comprising at least a first conduit, a second conduit and a third conduit.

13. The retrofit valve system according to claim 12, wherein said one or more fluid connectors are generally compliant.

14. The retrofit valve system according to claim 12, wherein said one or more fluid connectors are rigid.

15. The retrofit valve system according to claim 12, wherein each of said one or more fluid connectors are elongated, at least one end of said elongated fluid connectors releasably connected to either of said adapter plug or said retrofit valve.

16. The retrofit valve system according to claim 1 further comprising a second fluid chamber in said valve body of said retrofit valve, said second fluid chamber in fluid communication with said first fluid chamber.

17. The retrofit valve system according to claim 16 further comprising a bypass valve disposed in said second fluid chamber and a bypass channel hydraulically interconnecting said first fluid chamber and said second fluid chamber, said bypass valve configured to bypass water from said source of hot water until the temperature of the water at said bypass valve is at a desired temperature.

18. The retrofit valve system according to claim 17, wherein said water control cartridge is configured to provide pressure balancing.

19. The retrofit valve system according to claim 17, wherein the water from said source of hot water is pressurized.

20. The retrofit valve system according to claim 19, wherein said water valve distribution system has a circulating pump for pressurizing water from said source of hot water.

21. The retrofit system according to claim 17 further comprising a screen disposed in said retrofit valve, said screen configured so as to be cleaned by the movement of water from said supply of hot water when said water control cartridge is directing hot water to said to said water control fixture.

22. The retrofit system according to claim 21, wherein said screen is disposed in said bypass valve.

23. The retrofit system according to claim 17, wherein said bypass valve is a thermostatically controlled bypass valve having a bypass valve inlet, a bypass valve outlet and a thermally sensitive actuating element disposed therebetween.

24. The retrofit valve system according to claim 23, wherein said thermally sensitive actuating element comprises an actuating body and a rod member, said rod member configured to operatively extend from said actuating body and seat against a valve seat so as to close said bypass valve.

25. The retrofit valve system according to claim 24 further comprising a bias spring disposed in said bypass valve between said valve seat and said actuating body to urge said rod member away from said valve seat toward said actuating body so as to open said bypass valve.

26. The retrofit valve system according to claim 24 further comprising an over-travel spring disposed in said bypass valve against said actuating element.

27. The retrofit valve system according to claim 23, wherein said actuating element is a wax-filled cartridge actuator.

28. The retrofit valve system according to claim 23, wherein said actuating element is insulated.

29. The retrofit valve system according to claim 23 further comprising a screen disposed in said bypass valve, said screen configured so as to be cleaned by the movement of water from said supply of hot water when said water control cartridge is directing hot water to said to said water control fixture.

30. The retrofit valve system according to claim 1, wherein said water control cartridge is configured to provide pressure balancing.

31. The retrofit valve system according to claim 1, wherein said valve body further comprises a first valve port, a second valve port and a third valve port, each of said first valve port, said second valve port and said third valve port are hydraulically connected to said second plug interface on said adapter plug.

32. The retrofit valve system according to claim 31, wherein one or more fluid connectors interconnect said first valve port, said second valve port and said third valve port to aid second plug interface, said one or more fluid connectors comprising at least a first conduit, a second conduit and a third conduit.

33. A retrofit valve system for a valve manifold mounted in a water distribution system having a source of cold water, a source of hot water and a water control fixture, said valve manifold having a cartridge cavity with a valve cartridge interface comprising a hot water inlet port, a cold water inlet port and a discharge port, said valve manifold having one or more mounting means for mounting an existing escutcheon plate to said valve manifold, said retrofit valve system comprising:

an adapter plug having a plug body with a first end and a second end, a first plug interface at said first end and a second plug interface at said second end, said first end of said adapter plug inserted into said cartridge cavity of said valve manifold, said first plug interface hydraulically connected to said valve cartridge interface, said adapter plug further comprising a plurality of passageways interconnecting said first plug interface and said second plug interface;

a retrofit valve hydraulically connected to said adapter plug, said retrofit valve having a valve body with a first fluid chamber in said valve body;

a water control cartridge disposed in said first fluid chamber of said retrofit valve, said water control cartridge configured to mix water from said source of cold water and said source of hot water and discharge water to said water control fixture;

an escutcheon plate configured to cover said adapter plug and said retrofit valve;

a bracket attached to at least one of said one or more mounting means, said bracket configured to support said escutcheon plate; and a flow control handle operatively attached to said water control cartridge.

34. The retrofit valve system according to claim 33, wherein said water control cartridge comprises a stem extending generally outwardly from said retrofit valve through said escutcheon plate, said flow control handle attached to said stem.

35. The retrofit valve system according to claim 33, wherein said escutcheon plate comprises a blister portion, said blister portion adapted to cover said adapter plug and said retrofit valve.

36. The retrofit valve system according to claim 33, wherein said bracket is configured to support said escutcheon plate and said retrofit valve.

37. The retrofit valve system according to claim 33 further comprising a second fluid chamber in said valve body of said retrofit valve, said second fluid chamber in fluid communication with said first fluid chamber.

38. The retrofit valve system according to claim 37 further comprising a bypass valve disposed in said second fluid chamber and a bypass channel hydraulically interconnecting said first fluid chamber and said second fluid chamber, said bypass valve configured to bypass water from said source of hot water until the temperature of the water at said bypass valve is at a desired temperature.

39. The retrofit valve system according to claim 38, wherein said water control cartridge is configured to provide pressure balancing.

40. The retrofit valve system according to claim 38, wherein the water from said source of hot water is pressurized.

41. The retrofit valve system according to claim 40, wherein said water distribution system has a circulating pump for pressurizing water from said source of hot water.

42. The retrofit system according to claim 38 further comprising a screen disposed in said retrofit valve, said screen configured so as to be cleaned by the movement of water from said supply of hot water when said water control cartridge is directing hot water to said to said water control fixture.

43. The retrofit system according to claim 42, wherein said screen is disposed in said bypass valve.

44. The retrofit valve system according to claim 38, wherein said bypass valve is a thermostatically controlled bypass valve having a bypass valve inlet, a bypass valve outlet and a thermally sensitive actuating element disposed therebetween.

45. The retrofit valve system according to claim 44, wherein said thermally sensitive actuating element comprises an actuating body and a rod member, said rod member configured to operatively extend from said actuating body and seat against a valve seat so as to close said bypass valve.

46. The retrofit valve system according to claim 45 further comprising a bias spring disposed in said bypass valve between said valve seat and said actuating body to urge said rod member away from said valve seat toward said actuating body so as to open said bypass valve.

47. The retrofit system according to claim 44 further comprising a screen disposed in said bypass valve, said screen configured so as to be cleaned by the movement of water from said supply of hot water when said water control cartridge is directing hot water to said to said water control fixture.

48. The retrofit valve system according to claim 33, wherein said water control cartridge is configured to provide pressure balancing.

49. The retrofit valve system according to claim 33 further comprising one or more fluid connectors interconnecting said adapter plug and said retrofit valve, said one or more fluid connectors comprising at least a first conduit, a second conduit and a third conduit.

50. A retrofit valve system for a valve manifold mounted in a water distribution system having a source of cold water, a source of hot water and a water control fixture, said valve manifold having a cartridge cavity with a valve cartridge interface comprising a hot water inlet port, a cold water inlet port and a discharge port, said retrofit valve system comprising:
  an adapter plug having a plug body with a first end and a second end, a first plug interface at said first end and a second plug interface at said second end, said first end of said adapter plug inserted into said cartridge cavity of said valve manifold, said first plug interface hydraulically connected to said valve cartridge interface, said adapter plug further comprising a plurality of passageways interconnecting said first plug interface and said second plug interface;
  a retrofit valve hydraulically connected to said adapter plug, said retrofit valve having a valve body with a first fluid chamber, a second fluid chamber and a bypass channel hydraulically interconnecting said first fluid chamber and said second fluid chamber;
  a water control cartridge disposed in first fluid chamber of said retrofit valve, said water control cartridge configured to mix water from said source of cold water and said source of hot water and discharge water to said water control fixture; and
  a bypass valve disposed in said second fluid chamber, said bypass valve configured to bypass water from said source of hot water until the temperature of the water at said bypass valve is at a desired temperature.

51. The retrofit valve system according to claim 50, wherein said water control cartridge is configured to provide pressure balancing.

52. The retrofit valve system according to claim 50 further comprising an escutcheon plate and a flow control handle, said escutcheon plate configured to cover said adapter plug and said retrofit valve, said flow control handle operatively attached to said water control cartridge.

53. The retrofit valve system according to claim 52, wherein said water control cartridge comprises a stem extending generally outwardly from said retrofit valve through said escutcheon plate, said flow control handle attached to said stem.

54. The retrofit valve system according to claim 52, wherein said escutcheon plate comprises a blister portion, said blister portion adapted to cover said adapter plug and said retrofit valve.

55. The retrofit valve system according to claim 52 further comprising a bracket, said bracket configured to support said escutcheon plate and said retrofit valve.

56. The retrofit valve system according to claim 55, wherein said bracket is configured to support said retrofit valve such that the axial centerline of said retrofit valve is substantially perpendicular to said cartridge cavity.

57. The retrofit valve system according to claim 50 further comprising one or more fluid connectors interconnecting said adapter plug and said retrofit valve, said one or more fluid connectors comprising at least a first conduit, a second conduit and a third conduit.

58. The retrofit valve system according to claim 50, wherein the water from said source of hot water is pressurized.

59. The retrofit valve system according to claim 58, wherein said water distribution system has a circulating pump for pressurizing water from said source of hot water.

60. The retrofit system according to claim 50 further comprising a screen disposed in said retrofit valve, said screen configured so as to be cleaned by the movement of water from said supply of hot water when said water control cartridge is directing hot water to said to said water control fixture.

61. The retrofit valve system according to claim 60, wherein said screen is disposed in said bypass valve.

62. The retrofit valve system according to claim 50, wherein said bypass valve is a thermostatically controlled bypass valve having a bypass valve inlet! a bypass valve outlet and a thermally sensitive actuating element disposed therebetween.

63. The retrofit valve system according to claim 62, wherein said thermally sensitive actuating element comprises an actuating body and a rod member, said rod member configured to operatively extend from said actuating body and seat against a valve seat so as to close said bypass valve.

64. The retrofit valve system according to claim 63 further comprising a bias spring disposed in said bypass valve between said valve seat and said actuating body to urge said rod member away from said valve seat toward said actuating body so as to open said bypass valve.

65. The retrofit system according to claim 62 further comprising a screen disposed in said bypass valve, said screen configured so as to be cleaned by the movement of water from said supply of hot water when said water control cartridge is directing hot water to said to said water control fixture.

66. The retrofit valve system according to claim 62, wherein said water control cartridge is configured to provide pressure balancing.

67. An adapter plug for use with a valve manifold mounted in a water distribution system having a source of cold water, a source of hot water and a water control fixture, said valve manifold having a cartridge cavity with a valve cartridge interface comprising a hot water inlet port, a cold water inlet port and a discharge port, said adapter plug comprising:
  a plug body with a first end and a second end, said first end of said adapter plug sized and configured to be inserted into said cartridge cavity of said valve manifold;
  a first plug interface at said first end of said plug body, said first plug interface configured to hydraulically connect to said valve cartridge interface, said first plug interface having a first plug port, a second plug port and a third plug port;
  a second plug interface at said second end of said plug body, said second 5 plug interface having a fourth plug port, a fifth plug port and a sixth plug port; and
  a plurality of passageways interconnecting said first plug interface and said second plug interface.

68. The adapter plug according to claim 67, wherein said plurality of passageways comprises a first passageway, a second passageway and a third passageway.

69. The adapter plug according to claim 68, wherein said first passageway interconnects said first plug port and said fourth plug port, said second passageway interconnects said second plug port and said sixth plug port and said third passageway interconnects said third plug port and said fifth plug port.

70. The adapter plug according to claim 69, wherein said first plug port is hydraulically connected to said hot water inlet port, said second plug port is hydraulically connected to said cold water inlet port and said third plug port is hydraulically connected to said discharge port.

71. The adapter plug according to claim 70 further comprising one or more static seals on said adapter plug to hydraulically isolate each of said first plug port, said second plug port and said third plug port.

72. A retrofit valve for a valve manifold mounted in a water distribution system having a source of cold water, a source of hot water and a water control fixture, said valve manifold having a cartridge cavity with a valve cartridge interface comprising a hot water inlet port, a cold water inlet port and a discharge port, said retrofit valve comprising:
  a valve body with a first fluid chamber disposed therein, said retrofit valve 10 having a first valve port configured to hydraulically connect to said hot water inlet port, a second valve port configured to hydraulically connect to said cold water inlet port and a third valve port configured to hydraulically connect to said discharge port; and
  a water control cartridge disposed in said first fluid chamber of said valve body, said water control cartridge configured to mix water from said source of cold water and said source of hot water and discharge water to said water control fixture.

73. The retrofit valve according to claim 72 further comprising a second fluid chamber in said valve body, said second fluid chamber in fluid communication with said first fluid chamber.

74. The retrofit valve according to claim 73 further comprising a bypass valve disposed in said second fluid chamber and a bypass channel hydraulically interconnecting said first fluid chamber and said second fluid chamber, said bypass valve configured to bypass water from said source of hot water until the temperature of the water at said bypass valve is at a desired temperature.

75. The retrofit valve according to claim 74, wherein said water control cartridge is configured to provide pressure balancing.

76. The retrofit valve according to claim 74, wherein the water from said source of hot water is pressurized.

77. The retrofit valve according to claim 76, wherein said water distribution system has a circulating pump for pressurizing water from said source of hot water.

78. The retrofit valve according to claim 74 further comprising a screen disposed in said retrofit valve, said screen configured so as to be cleaned by the movement of water from said supply of hot water when said water control cartridge is directing hot water to said to said water control fixture.

79. The retrofit valve according to claim 78, wherein said screen is disposed in said bypass valve.

80. The retrofit valve according to claim 74, wherein said bypass valve is a thermostatically controlled bypass valve having a bypass valve inlet, a bypass valve outlet and a thermally sensitive actuating element disposed therebetween.

81. The retrofit valve according to claim 80, wherein said thermally sensitive actuating element comprises an actuating body and a rod member, said rod member configured to operatively extend from said actuating body and seat against a valve seat so as to close said bypass valve.

82. The retrofit valve according to claim 81 further comprising a bias spring disposed in said bypass valve between said valve seat and said actuating body 10 to urge said rod member away from said valve seat toward said actuating body so as to open said bypass valve.

83. The retrofit valve according to claim 82 further comprising an over-travel spring disposed in said bypass valve against said actuating element.

84. The retrofit valve according to claim 80, wherein said actuating element is a wax-filled cartridge actuator.

85. The retrofit valve according to claim 80, wherein said actuating element is insulated.

86. The retrofit valve according to claim 80 further comprising a screen disposed in said bypass valve, said screen configured so as to be cleaned by the movement of water from said supply of hot water when said water control cartridge is directing hot water to said to said water control fixture.

87. The retrofit valve according to claim 72, wherein said water control cartridge is configured to provide pressure balancing.

* * * * *